US012647173B2

(12) United States Patent
Bhamri et al.

(10) Patent No.: US 12,647,173 B2
(45) Date of Patent: Jun. 2, 2026

(54) BEAM FAILURE DETECTION USING SHARED REFERENCE SIGNALS

(71) Applicant: Lenovo (Singapore) Pte. Ltd., New Tech Park (SG)

(72) Inventors: Ankit Bhamri, Rödermark (DE); Karthikeyan Ganesan, Kronberg im Taunus (DE); Ali Ramadan Ali, Kraiburg am Inn (DE); Robin Thomas, Bad Nauheim (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 322 days.

(21) Appl. No.: 18/549,157

(22) PCT Filed: Mar. 3, 2022

(86) PCT No.: PCT/IB2022/051896
§ 371 (c)(1),
(2) Date: Sep. 5, 2023

(87) PCT Pub. No.: WO2022/185254
PCT Pub. Date: Sep. 9, 2022

(65) Prior Publication Data
US 2024/0146384 A1 May 2, 2024

Related U.S. Application Data

(60) Provisional application No. 63/155,734, filed on Mar. 3, 2021, provisional application No. 63/155,735, filed on Mar. 3, 2021.

(51) Int. Cl.
*H04B 7/06* (2006.01)
*H04B 7/08* (2006.01)

(52) U.S. Cl.
CPC ....... *H04B 7/06964* (2023.05); *H04B 7/0695* (2013.01); *H04B 7/088* (2013.01)

(58) Field of Classification Search
CPC .. H04B 7/06964; H04B 7/088; H04B 7/0617; H04B 7/0695; H04B 7/0408;
(Continued)

(56) References Cited

U.S. PATENT DOCUMENTS 11,843,559 B2 * 12/2023 Zhang .................. H04B 7/0695
12,381,613 B2 * 8/2025 Bhamri .................. H04B 7/088
(Continued)

OTHER PUBLICATIONS

CATT, "Remaining issues on DL beam recovery", 3GPP TSG RAN WG1 Meeting AH 1801 R1-1800242, Jan. 22-26, 2018, pp. 1-5.
(Continued)

*Primary Examiner* — Khalid W Shaheed
(74) *Attorney, Agent, or Firm* — Kunzler Needham Hilton

(57) ABSTRACT

Apparatuses, methods, and systems are disclosed for shared beam failure detection (BFD) and recovery. One apparatus includes a transceiver that receives a configuration from a radio access network (RAN) for a set of shared BFD reference signals (RS), where the set of shared BFD RS is quasi-co-located with a set of shared user equipment (UE) receive beams applicable to a group of UEs. The processor measures a signal strength on the set of shared BFD RS, increments a shared beam failure instance (BFI) counter if the measured signal strength is below a BFD RS threshold value, and also increments the shared BFI upon receiving a BFI indication from a UE in the group of UEs. The processor declares BFD for the group of UEs in response to the shared BFI counter reaching a maximum value of beam failure.

20 Claims, 10 Drawing Sheets

(58) Field of Classification Search
    CPC .. H04B 7/06952; H04B 17/309; H04B 7/024;
                H04B 17/328; H04W 72/23; H04W
                72/046; H04W 72/231
    See application file for complete search history.

(56)                References Cited

U.S. PATENT DOCUMENTS

| | | |
|---|---|---|
| 2019/0053312 A1 | 2/2019 | Xia et al. |
| 2020/0252990 A1 | 8/2020 | Ganesan et al. |
| 2020/0383167 A1* | 12/2020 | Sengupta ........... H04B 7/06964 |
| 2022/0006505 A1* | 1/2022 | Ryu ...................... H04W 24/10 |

OTHER PUBLICATIONS

Vivo, "Clarification on beam failure recovery and text proposal", 3GPP TSG-RAN WG2 NR Ad hoc 1801 R2-1800867, Jan. 22-26, 2018, pp. 1-8.
Vivo, "LBT impacts on BFD in NR-U", 3GPP TSG-RAN WG2 Meeting #104 R2-1818267, Nov. 12-16, 2018, pp. 1-3.
PCT/IB2022/051896, "International Search Report and the Written Opinion of the International Searching Authority, or the Declaration", International Searching Authority, Jun. 10, 2022, pp. 1-16.
Li et al., "Beam Management in Millimeter-wave Communications for 5G and Beyond", DOI 10.1109/ACCESS.2019.2963514, IEEE Access, Dec. 29, 2019, pp. 1-12.
Vivo, "Further discussion on MTRP multibeam enhancement", 3GPP TSG RAN WG1 #103-e R1-2007647, Oct. 26-Nov. 13, 2020, pp. 1-8.

3GPP, "3rd Generation Partnership Project; Technical Specification Group Radio Access Network; NR; Requirements for support of radio resource management (Release 17)", 3GPP TS 38.133 V17.0.0, Dec. 2020, pp. 1-1812.
3GPP, "3rd Generation Partnership Project; Technical Specification Group Radio Access Network; NR; Physical channels and modulation (Release 16)", 3GPP TS 38.211 V16.4.0, Dec. 2020, pp. 1-133.
3GPP, "3rd Generation Partnership Project; Technical Specification Group Radio Access Network; NR; Multiplexing and channel coding (Release 16)", 3GPP TS 38.212 V16.4.0, Dec. 2020, pp. 1-152.
3GPP, "3rd Generation Partnership Project; Technical Specification Group Radio Access Network; NR; Physical layer procedures for control (Release 16)", 3GPP TS 38.213 V16.4.0, Dec. 2020, pp. 1-181.
3GPP, "3rd Generation Partnership Project; Technical Specification Group Radio Access Network; NR; Physical layer procedures for data (Release 16)", 3GPP TS 38.214 V16.4.0, Dec. 2020, pp. 1-169.
3GPP, "3rd Generation Partnership Project; Technical Specification Group Radio Access Network; NR; User Equipment (UE) radio access capabilities (Release 16)", 3GPP TS 38.306 V16.3.0, Dec. 2020, pp. 1-135.
3GPP, "3rd Generation Partnership Project; Technical Specification Group Radio Access Network; NR; Medium Access Control (MAC) protocol specification (Release 16)", 3GPP TS 38.321 V16.3.0, Dec. 2020, pp. 1-156.

* cited by examiner

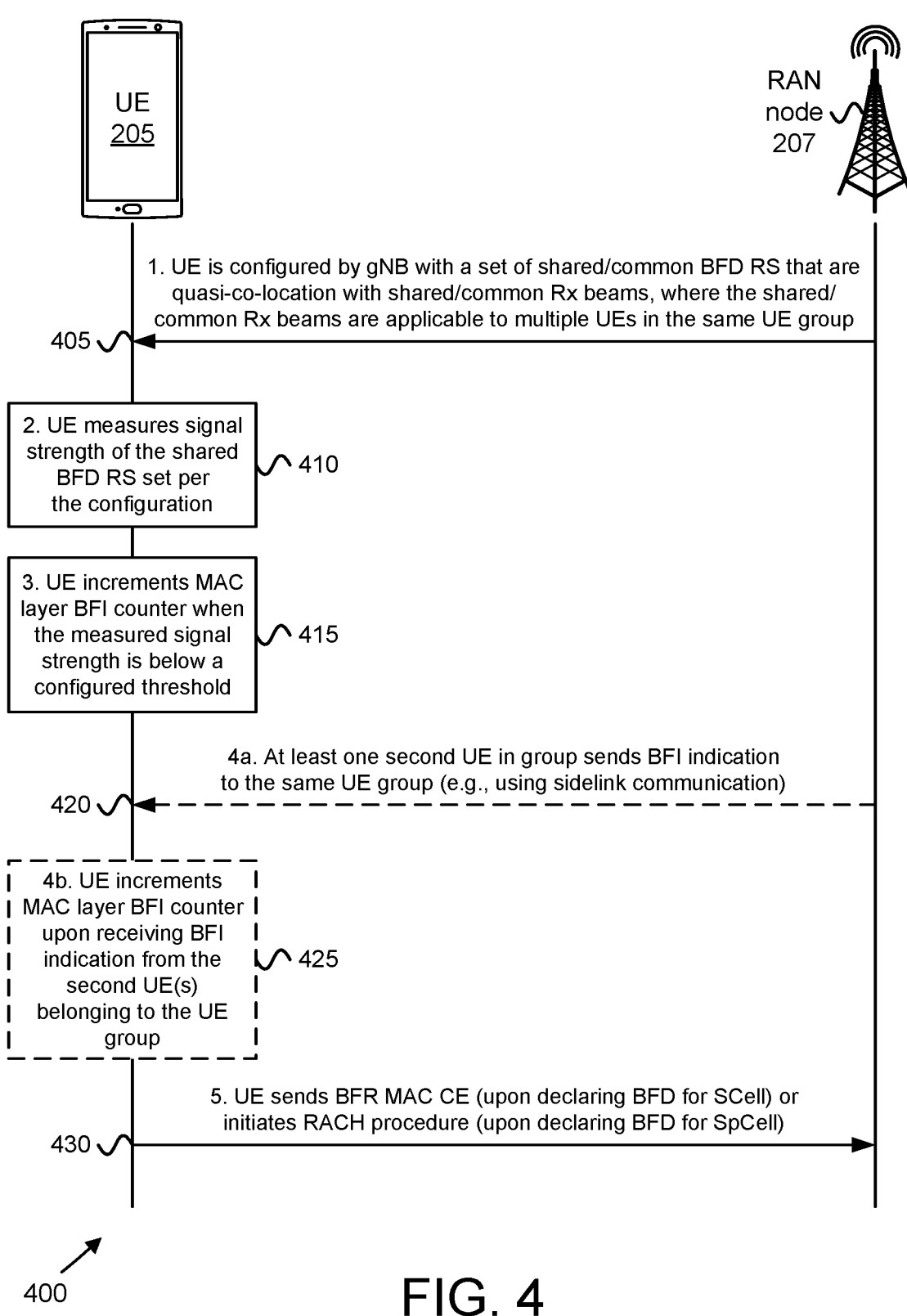

RAN
node
207

UE
205

1. UE is configured by gNB with a set of shared/common BFD RS that are quasi-co-location with shared/common Rx beams, where the shared/common Rx beams are applicable to multiple UEs in the same UE group

405

2. UE measures signal strength of the shared BFD RS set per the configuration

410

3. UE increments MAC layer BFI counter when the measured signal strength is below a configured threshold

415

4a. At least one second UE in group sends BFI indication to the same UE group (e.g., using sidelink communication)

420

4b. UE increments MAC layer BFI counter upon receiving BFI indication from the second UE(s) belonging to the UE group

425

5. UE sends BFR MAC CE (upon declaring BFD for SCell) or initiates RACH procedure (upon declaring BFD for SpCell)

```
-- ASN1START
-- TAG-RADIOLINKMONITORINGCONFIG-START

RadioLinkMonitoringConfig ::=          SEQUENCE {
    failureDetectionResourcesToAddModList     SEQUENCE (SIZE(1..maxNrofFailureDetectionResources)) OF
                                                  RadioLinkMonitoringRS          OPTIONAL, -- Need N
    failureDetectionResourcesToReleaseList    SEQUENCE (SIZE(1..maxNrofFailureDetectionResources)) OF
                                                  RadioLinkMonitoringRS-Id        OPTIONAL, -- Need N
    beamFailureInstanceMaxCount        ENUMERATED { n1, n2, n3, n4, n5, n6, n8, n10}   OPTIONAL, -- Need R
    beamFailureDetectionTimer          ENUMERATED { pbfd1, pbfd2, pbfd3, pbfd4, pbfd5,
                                                    pbfd6, pbfd8, pbfd10}          OPTIONAL, -- Need R
    ...
}

RadioLinkMonitoringRS ::=          SEQUENCE {
    radioLinkMonitoringRS-Id        RadioLinkMonitoringRS-Id,
    purpose                         ENUMERATED {beamFailure, rlf, both},
    detectionResource               CHOICE {
        ssb-Index                       SSB-Index,
        csi-RS-Index                    NZP-CSI-RS-ResourceId,
        shared-RS-Index                 shared-beam-Index
        shared-SSB-Index,
        shared-NZP-CSI-RS-ResourceId,
    },                                                                  ⌐ 505
    ...
}

-- TAG-RADIOLINKMONITORINGCONFIG-STOP
-- ASN1STOP
```

FIG. 5

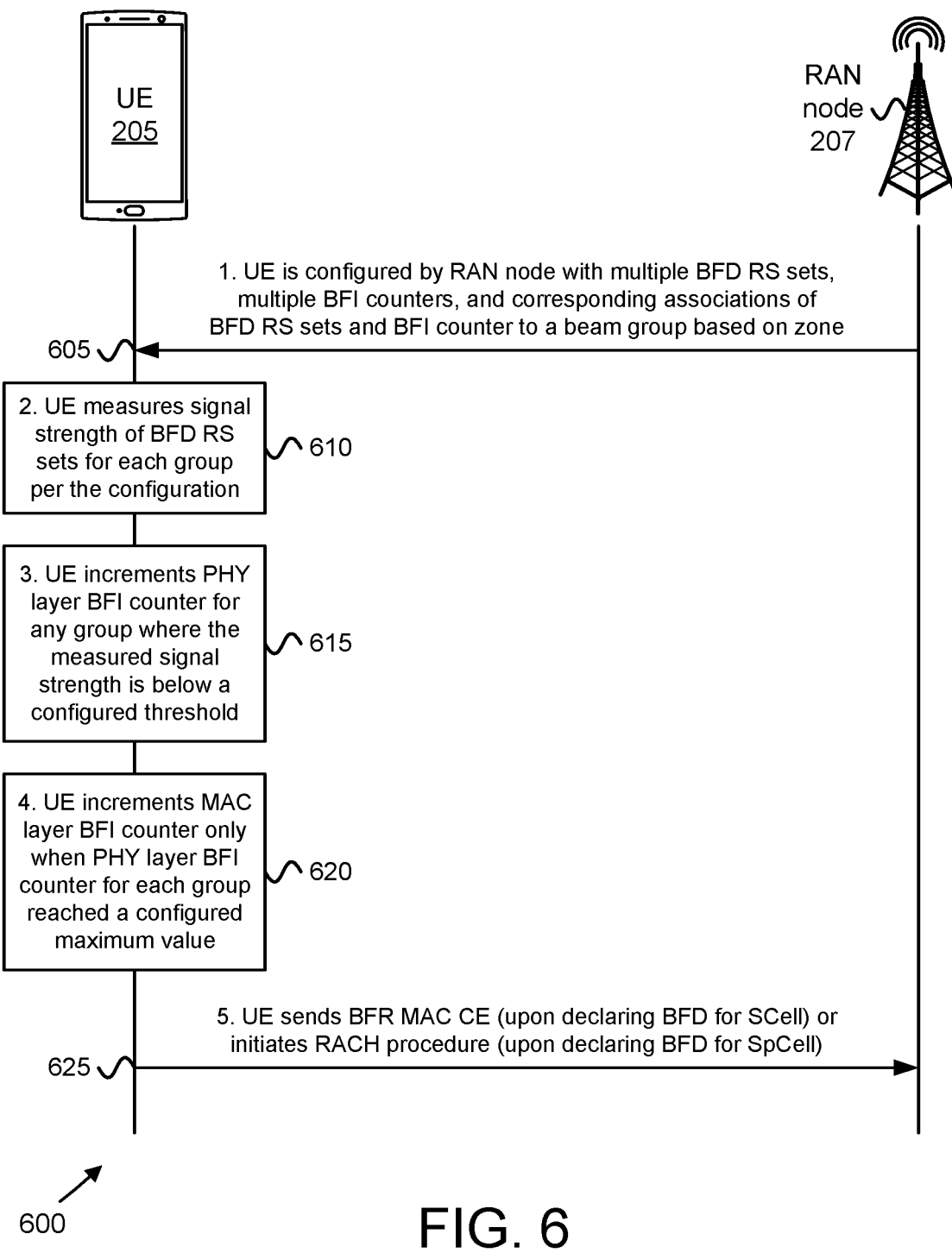

1. UE is configured by RAN node with multiple BFD RS sets, multiple BFI counters, and corresponding associations of BFD RS sets and BFI counter to a beam group based on zone

605

2. UE measures signal strength of BFD RS sets for each group per the configuration

610

3. UE increments PHY layer BFI counter for any group where the measured signal strength is below a configured threshold

615

4. UE increments MAC layer BFI counter only when PHY layer BFI counter for each group reached a configured maximum value

620

5. UE sends BFR MAC CE (upon declaring BFD for SCell) or initiates RACH procedure (upon declaring BFD for SpCell)

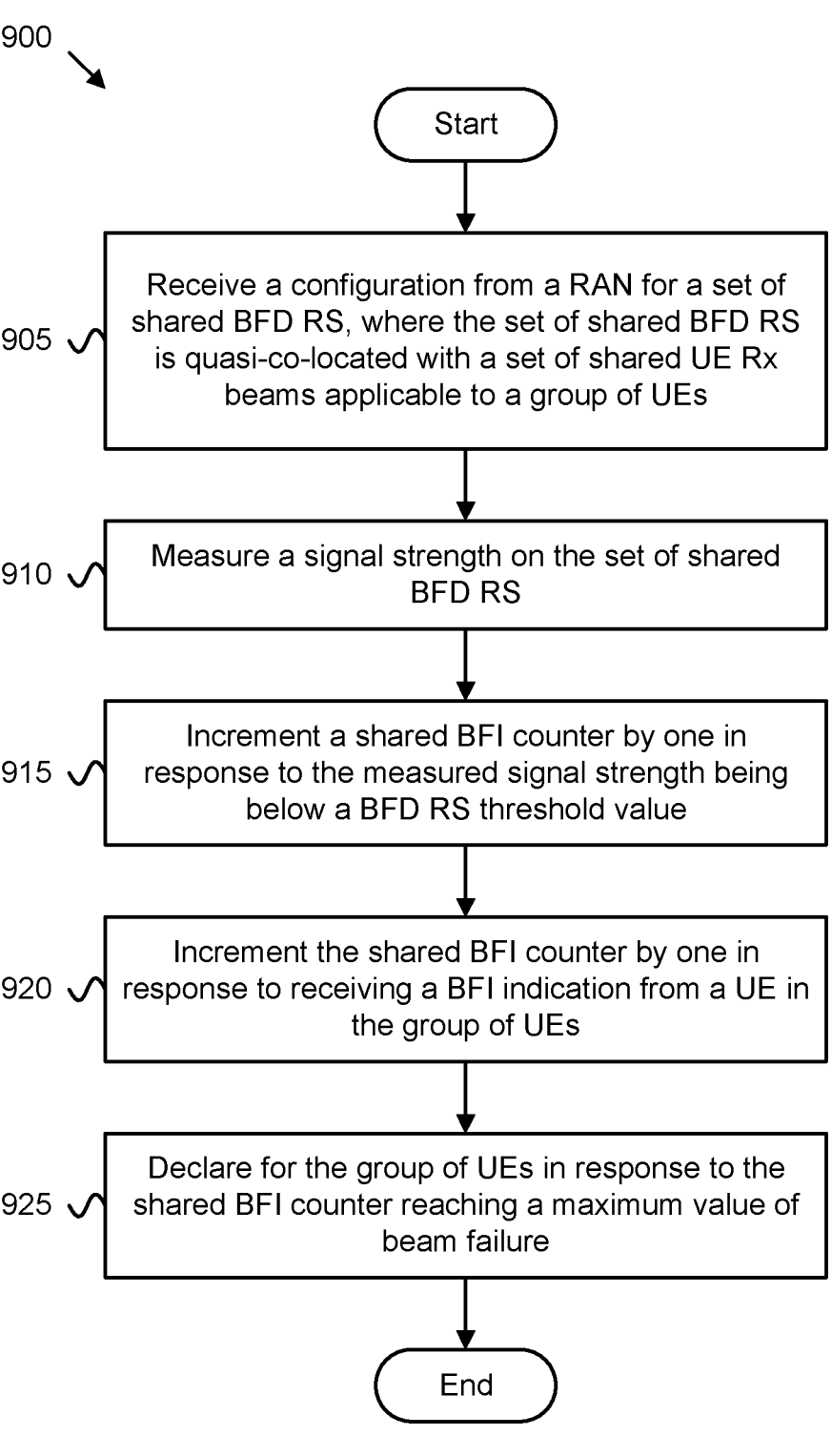

900

Start

905 — Receive a configuration from a RAN for a set of shared BFD RS, where the set of shared BFD RS is quasi-co-located with a set of shared UE Rx beams applicable to a group of UEs 910 — Measure a signal strength on the set of shared BFD RS 915 — Increment a shared BFI counter by one in response to the measured signal strength being below a BFD RS threshold value 920 — Increment the shared BFI counter by one in response to receiving a BFI indication from a UE in the group of UEs 925 — Declare for the group of UEs in response to the shared BFI counter reaching a maximum value of beam failure End

FIG. 9

BEAM FAILURE DETECTION USING SHARED REFERENCE SIGNALS

CROSS-REFERENCE TO RELATED APPLICATIONS

This application claims priority to U.S. Provisional Patent Application No. 63/155,734 entitled "SHARED BEAM FAILURE DETECTION AND RECOVERY PROCE-DURE" and filed on 3 Mar. 2021 for Ankit Bhamri, Karthikeyan Ganesan, Ali Ramadan Ali, Robin Thomas, which application is incorporated herein by reference. This application also claims priority to U.S. Provisional Patent Application No. 63/155,735 entitled "LOCATION-BASED MULTIPLE BEAM FAILURE DETECTION AND BEAM FAILURE RECOVERY PROCEDURE" and filed on 3 Mar. 2021 for Ankit Bhamri, Karthikeyan Ganesan, Ali Ramadan Ali, Robin Thomas, which application is also incorporated herein by reference.

FIELD

The subject matter disclosed herein relates generally to wireless communications and more particularly relates to shared beam failure detection ("BFD") and beam failure recovery ("BFR") procedure.

BACKGROUND

For Third Generation Partnership Project ("3GPP") New Radio ("NR", i.e., $5^{th}$ generation Radio Access Technology ("RAT")), beam-management procedures for Release 15 and 16 ("Rel-15/16") rely heavily on constant/periodic exchange of reference signals and corresponding measurement report-ing between the network and User Equipment ("UE") for both uplink ("UL") and downlink ("DL") control/data chan-nel transmissions. Consequently, the latency and overhead involved for such procedures is quite high. Moreover, the issues are expected to be further escalated for higher fre-quency ranges where the beams would be required to be very narrow in order to serve different use cases.

BRIEF SUMMARY

Disclosed are procedures for shared beam failure detec-tion and recovery. Said procedures may be implemented by apparatus, systems, methods, or computer program prod-ucts.

One method at a User Equipment ("UE") for shared beam failure detection and recovery includes receiving a configu-ration from a radio access network ("RAN") for a set of shared beam failure detection reference signals ("BFD RS") and measuring a signal strength on the set of shared BFD RS, where the set of shared BFD RS is quasi-co-located with a set of shared UE receive ("Rx") beams applicable to a group of UEs. The method includes incrementing a shared Beam Failure Instance ("BFI") counter by one in response to the measured signal strength being below a BFD RS thresh-old value and also incrementing the shared BFI counter by one in response to receiving a BFI indication from a UE in the group of UEs. The method includes declaring BFD for the group of UEs in response to the shared BFI counter reaching a maximum value of beam failure.

One method at a RAN for shared beam failure detection and recovery includes transmitting a configuration to a UE for a set of shared BFD RS, where the set of shared BFD RS is quasi-co-located with a set of shared UE Rx beams applicable to a group of UEs. The second method includes transmitting one or more shared BFD RS and receiving a BFD indication from a primary UE in the group of UEs. The second method includes configuring the group of UEs with new candidate beams in response to the BFD indication.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 is a diagram illustrating one embodiment of a procedure for shared beam failure detection and recovery;

FIG. 5 is a diagram illustrating one embodiment of an Abstract Syntax Notation 1 ("ASN.1") structure for an enhanced radio link monitoring configuration information element;

FIG. 6 is a diagram illustrating one embodiment of a procedure for zone-based beam failure detection and recov-ery;

FIG. 9 is a flowchart diagram illustrating one embodiment of a first method for shared beam failure detection and recovery.

DETAILED DESCRIPTION

Figure 1:
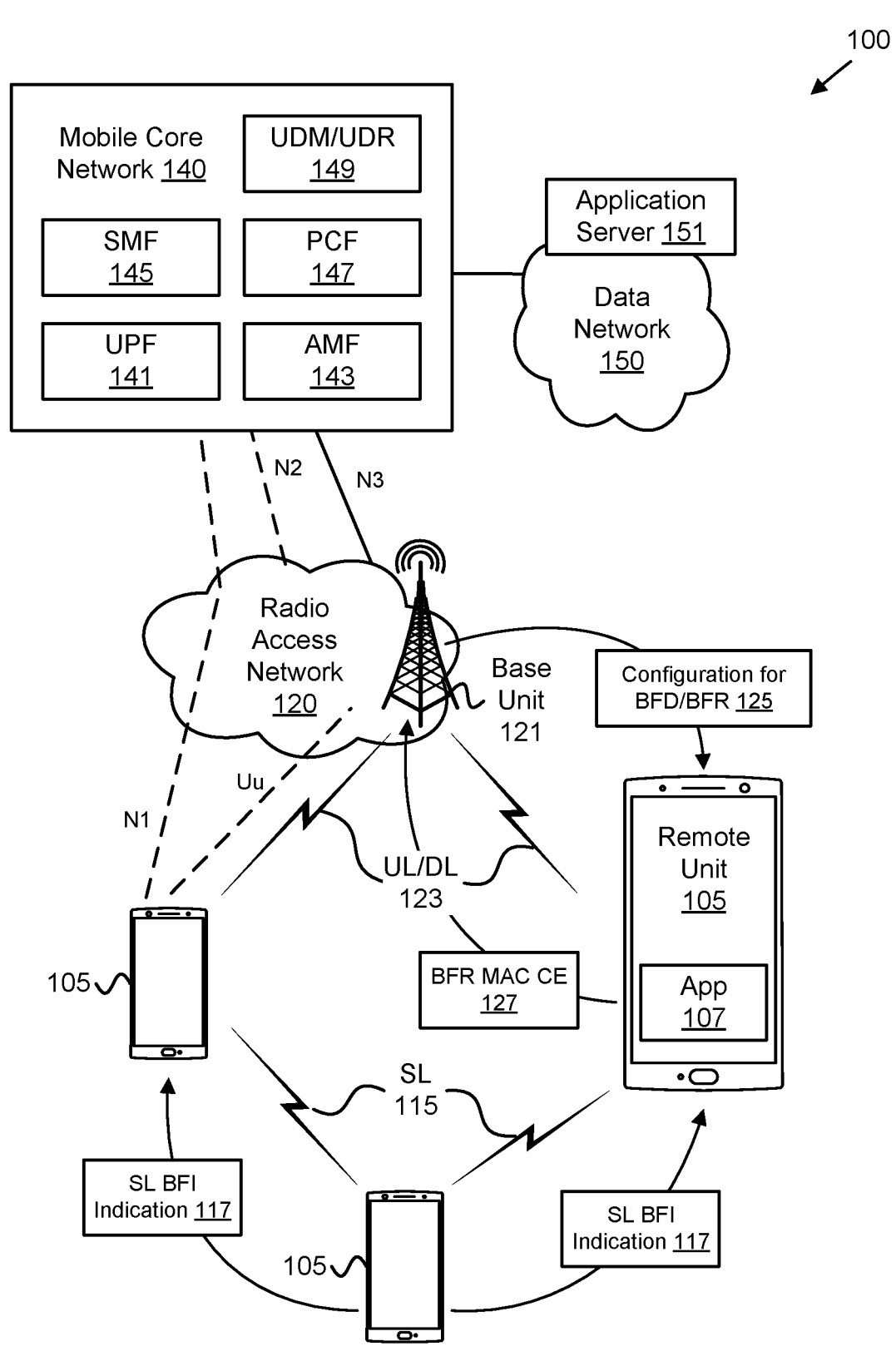
FIG. 1 is a block diagram illustrating one embodiment of a wireless communication system for shared beam failure detection and recovery.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be imple-mented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, "one or more of A, B and C" includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for shared beam failure detection and recovery. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Disclosed are solutions that enhance beam failure detection ("BFD") and beam failure recovery ("BFR") using shared beam management procedures. The solutions may be implemented by apparatus, systems, methods, or computer program products.

One solution includes using a BFD RS, such that the BFD and BFR procedure could be jointly performed for multiple UEs within the same group. In certain embodiments, additional procedure on when the BFI is indicated from PHY to MAC based on BFD across one or multiple UEs within the group is performed. In certain embodiments, a primary UE is designated within a group to handle all the BFD and BFD procedure. In certain embodiments, signaling between different UEs with sidelink ("SL") assistance is also performed for joint BFD and BFR across multiple UEs. Additional signaling between the user equipment ("UE") and gNB (i.e., NR base station) may be performed to support joint BFD and BFR procedure.

Beneficially, if one UE within a group is requesting beam recovery procedure, then it can be initiated also for all other UEs that are grouped together without the need for separate procedure for each of the UEs. Beneficially, the responsibility of beam failure detection could be shared across multiple UEs within a group and therefore BFD and BFR could be much faster.

Another solution includes using multiple BFD RS sets that can be associated based on location and/or region and/or zone and/or Transmission/Reception Points ("TRPs"). In certain embodiments, the BFD and BFR procedures are performed independently across these multiple sets. In certain embodiments, a physical ("PHY") layer-based BFD and BFR are performed procedure, e.g., without the need to indicate the Medium Access Control ("MAC") until all the Reference Signal ("RS") sets declare BFD.

Beneficially, location/zone/region-based multiple beam failure detection and beam failure recovery procedures would allow the UE(s) to get new candidate beams for the location/zone for which the BFD is detected in PHY without initiating MAC recovery procedure by utilizing the beams from other locations/zones where the beam is still valid. Beneficially, location/zone/region-based beam failure recovery procedure will not affect the beam(s) used by UE(s) in other zones/regions.

FIG. 1 depicts a wireless communication system 100 for shared beam failure detection and recovery, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the Fifth-Generation ("5G") cellular system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Furthermore, the UL communication signals may comprise one or more uplink channels, such as the Physical Uplink Control Channel ("PUCCH") and/or Physical Uplink Shared Channel ("PUSCH"), while the DL communication signals may comprise one or more downlink channels, such as the Physical Downlink Control Channel ("PDCCH") and/or Physical Downlink Shared Channel ("PDSCH"). Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a PDN Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121.

Note that during NR operation on unlicensed spectrum (referred to as "NR-U"), the base unit 121 and the remote unit 105 communicate over unlicensed (i.e., shared) radio spectrum. Similarly, during LTE operation on unlicensed spectrum (referred to as "LTE-U"), the base unit 121 and the remote unit 105 also communicate over unlicensed (i.e., shared) radio spectrum.

In one embodiment, the mobile core network 140 is a 5G Core network ("5GC") or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO") and/or Public Land Mobile Network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM") and a User Data Repository ("UDR"). In some embodiments, the UDM is co-located with the UDR, depicted as combined entity "UDM/UDR" 149. Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network ("DN"), in the 5G architecture. The AMF 143 is responsible for termination of Non-Access Spectrum ("NAS") signaling, NAS ciphering and integrity protection, registration management, connection management, mobility management, access authentication and authorization, security context management. The SMF 145 is responsible for session management (i.e., session establishment, modification, release), remote unit (i.e., UE) Internet Protocol ("IP") address allocation and management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI")

while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for shared beam failure detection and recovery apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In various embodiments, the remote units 105 may communicate directly with each other (e.g., device-to-device communication) using sidelink communication signals 115. Here, sidelink transmissions may occur on sidelink resources. A remote unit 105 may be provided with different sidelink communication resources for different allocation modes.

While the below embodiments describe beam management for beam-based communication between a remote unit 105 and a base unit 121 (e.g., between UE and gNB/RAN node), the below described solutions may also be applied to beam-based sidelink communication between remote units 105 (i.e., device-to-device ("D2D") communication).

Communication devices, such as the remote unit 105 may be configured with at least one set of beam failure detection reference signals ("BFD RS") to facilitate beam-based communication. Accordingly, the base unit 121 may send a configuration 125 for BFD and/or BFR to the remote unit 105. The configured remote unit 105 measures the BFD RS and, upon detecting beam failure, initiates BFR, e.g., by sending a BFR MAC CE 127 to the base unit 121. In certain embodiments, a remote unit may send a beam failure instance ("BFI") indication 117, e.g., on sidelink, to one or more remote units 105 in a same UE group. The below solutions describe enhancements to BFD and BFR procedures.

In the following descriptions, the term "gNB" is used for the base station/base unit, but it is replaceable by any other radio access node, e.g., RAN node, ng-eNB, eNB, Base Station ("BS"), Access Point ("AP"), NR BS, 5G NB, TRP, etc. Additionally, the term "UE" is used for the mobile station/remote unit, but it is replaceable by any other remote device, e.g., remote unit, MS, ME, etc. Further, the operations are described mainly in the context of 5G NR. However, the below described solutions/methods are also equally applicable to other mobile communication systems for shared beam failure detection and recovery.

Figure 2:
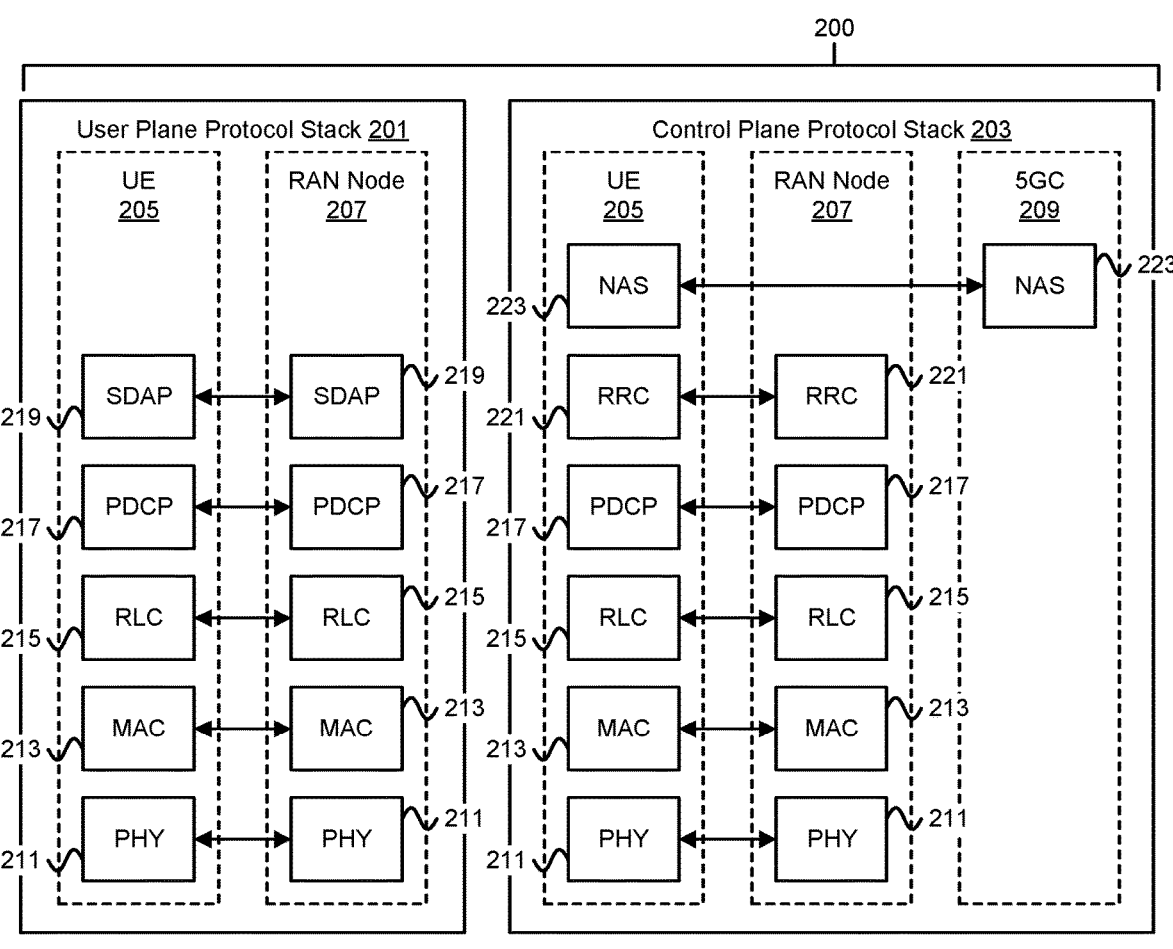
FIG. 2 is a diagram illustrating one embodiment of a 3GPP New Radio ("NR") protocol stack.

FIG. 2 depicts a NR protocol stack 200, according to embodiments of the disclosure. While FIG. 2 shows a UE 205, a RAN node 207 and the 5G core network 209, these are representative of a set of remote units 105 interacting with a base unit 121 and a mobile core network 140. As depicted, the protocol stack 200 comprises a User Plane protocol stack 201 and a Control Plane protocol stack 203. The User Plane protocol stack 201 includes a physical ("PHY") layer 211, a Medium Access Control ("MAC") sublayer 213, a Radio Link Control ("RLC") sublayer 215, a Packet Data Convergence Protocol ("PDCP") sublayer 217, and Service Data Adaptation Protocol ("SDAP") layer 219. The Control Plane protocol stack 203 includes a physical layer 211, a MAC sublayer 213, a RLC sublayer 215, and a PDCP sublayer 217. The Control Place protocol stack 203 also includes a Radio Resource Control ("RRC") layer 221 and a Non-Access Stratum ("NAS") layer 223.

The AS layer (also referred to as "AS protocol stack") for the User Plane protocol stack 201 consists of at least SDAP, PDCP, RLC and MAC sublayers, and the physical layer. The AS layer for the Control Plane protocol stack 203 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 221 and the NAS layer 223 for the control plane and includes, e.g., an Internet Protocol ("IP") layer or PDU Layer (note depicted) for the user plane. L1 and L2 are referred to as "lower layers," while L3 and above (e.g., transport layer, application layer) are referred to as "higher layers" or "upper layers."

The physical layer 211 offers transport channels to the MAC sublayer 213. The MAC sublayer 213 offers logical channels to the RLC sublayer 215. The RLC sublayer 215 offers RLC channels to the PDCP sublayer 217. The PDCP sublayer 217 offers radio bearers to the SDAP sublayer 219 and/or RRC layer 221. The SDAP sublayer 219 offers QoS flows to the core network (e.g., 5GC). The RRC layer 221 provides for the addition, modification, and release of Carrier Aggregation ("CA") and/or Dual Connectivity ("DC"). The RRC layer 221 also manages the establishment, configuration, maintenance, and release of Signaling Radio Bearers ("SRBs") and Data Radio Bearers ("DRBs").

The MAC layer 213 is the lowest sublayer in the Layer-2 architecture of the NR protocol stack. Its connection to the PHY layer 211 below is through transport channels, and the connection to the RLC layer 215 above is through logical channels. The MAC layer 213 therefore performs multiplexing and demultiplexing between logical channels and transport channels: the MAC layer 213 in the transmitting side constructs MAC PDUs, known as transport blocks, from MAC Service Data Units ("SDUs") received through logical channels, and the MAC layer 213 in the receiving side recovers MAC SDUs from MAC PDUs received through transport channels.

The MAC layer 213 provides a data transfer service for the RLC layer 215 through logical channels, which are either control logical channels which carry control data (e.g., RRC signaling) or traffic logical channels which carry user plane data. On the other hand, the data from the MAC layer 213 is exchanged with the physical layer through transport channels, which are classified as downlink or uplink. Data is multiplexed into transport channels depending on how it is transmitted over the air.

The PHY layer 211 is responsible for the actual transmission of data and control information via the air interface, i.e., the PHY Layer 211 carries all information from the MAC transport channels over the air interface on the transmission side. Some of the important functions performed by the PHY layer 211 include coding and modulation, link adaptation (e.g., Adaptive Modulation and Coding ("AMC")), power control, cell search (for initial synchronization and handover purposes) and other measurements (inside the 3GPP system (i.e., NR and/or LTE system) and between systems) for the RRC layer 221. The PHY layer 211 performs transmissions based on transmission parameters, such as the modulation scheme, the coding rate (i.e., the modulation and coding scheme ("MCS")), the number of physical resource blocks etc.

Figure 3A:
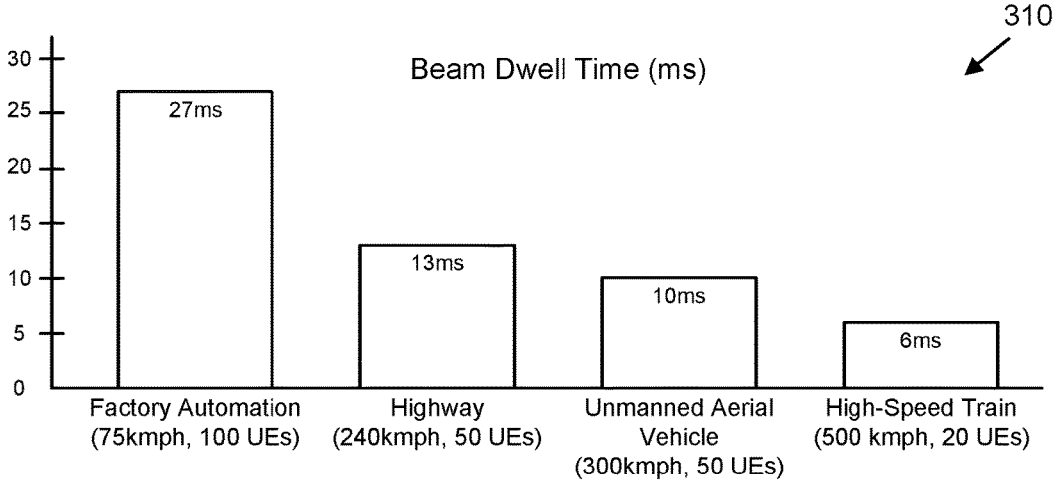
FIG. 3A is a diagram illustrating one embodiment of beam-dwelling time.

FIG. 3A shows a comparison chart 310 for beam-dwelling time (measured in ms) for the use cases of: Factory Automation, Highway, Unmanned Aerial Vehicle ("UAV"), and high-speed train ("FIST"). It can be seen that for deployment scenarios with high user mobility (relative), the beam-dwell time can be quite small.

Figure 3B:
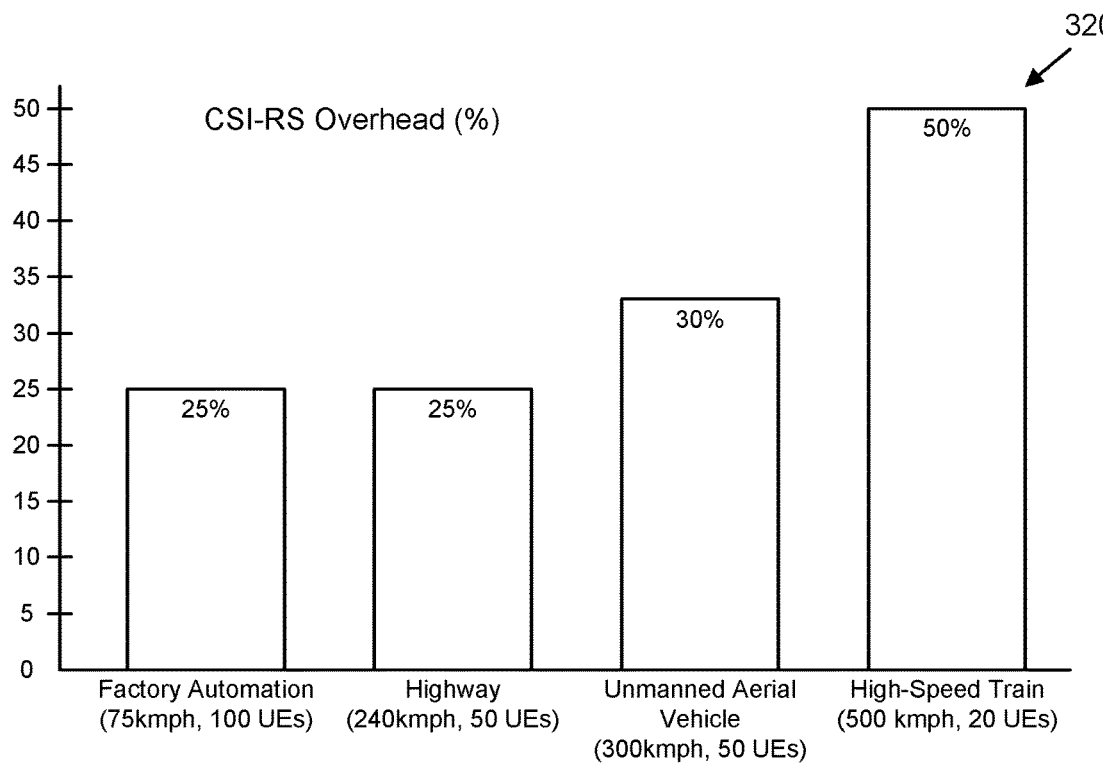
FIG. 3B is a diagram illustrating another embodiment of Channel State Information Reference Signal ("CSI-RS") overhead.

FIG. 3B shows a comparison chart 320 for beam-dwelling time (measured in ms) for the use cases of: Factory Automation, Highway, UAV, and HST. It can be seen that for deployment scenarios with higher number of users and high user mobility (relative), the overhead can be quite huge.

Figure 3C:
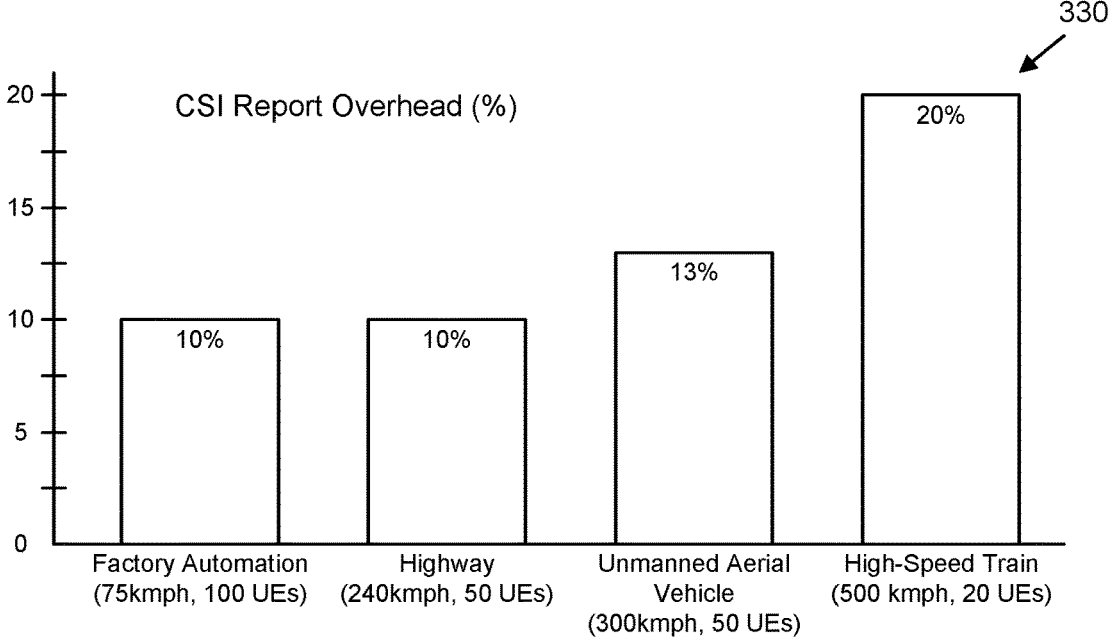
FIG. 3C is a diagram illustrating one embodiment of Channel State Information ("CSI") report overhead.

FIG. 3C shows a comparison chart 330 for beam-dwelling time (measured in ms) for the use cases of: Factory Automation, Highway, UAV, and HST. It can be seen that for deployment scenarios with higher number of users and high user mobility (relative), the overhead can be quite huge.

In NR, beam management is defined as a set of Layer 1/2 procedures to acquire and maintain a set of beam pair links, i.e., a beam used at transmit-receive point(s) (TRP(s)) for BS side paired with a beam used at the UE 205. The beam pair links can be used for DL and UL transmission/reception. The set of Layer 1/2 beam management procedures include at least the following six aspects: Beam sweeping, Beam measurement, Beam reporting, Beam determination, Beam maintenance, and Beam recovery.

Beam sweeping refers to an operation of covering a spatial area using multiple beams, with beams transmitted and/or received during a time interval in a predetermined way. Beam measurement is where the TRP(s) or the UE 205 measures characteristics of received beamformed ("BF") signals. Beam reporting is where the UE 205 reports information of BF signal(s) based on beam measurement.

Beam determination is where the TRP(s) or the UE 205 selects of its own Tx/Rx beam(s). Beam maintenance is where the TRP(s) or the UE 205 maintains the candidate beams by beam tracking or refinement to adapt to the channel changes due to blockage or to movement of the UE 205. Beam recovery is where the UE 205 identifies new candidate beam(s) after detecting beam failure and subsequently inform TRP of beam recovery request with information of indicating the new candidate beam(s).

Regarding beam failure detection and beam failure recovery in NR, the MAC entity may be configured by RRC per Serving Cell with a beam failure recovery procedure which is used for indicating to the serving gNB (e.g., RAN node 207) of a new Synchronization Signal Block ("SSB") or CSI-RS when beam failure is detected on the serving SSB(s)/CSI-RS(s). Beam failure is detected by counting beam failure instance indication from the lower layers to the MAC entity. If information element ("IE") beamFailureRecoveryConfig is reconfigured by upper layers, e.g., during an ongoing Random Access procedure for beam failure recovery for SpCell, the MAC entity shall stop the ongoing Random Access procedure and initiate a Random Access procedure using the new configuration.

RRC layer 221 may configure the following parameters in the IE BeamFailureRecoveryConfig, IE BeamFailureRecoverySCellConfig, and the IE RadioLinkMonitoringConfig for the Beam Failure Detection and Recovery procedure: parameter beamFailureInstanceMaxCount for the beam failure detection; parameter beamFailureDetectionTimer for the beam failure detection; parameter beamFailureRecoveryTimer for the beam failure recovery procedure; parameter rsrp-ThresholdSSB is an Reference Signal Received Power ("RSRP") threshold for the SpCell beam failure recovery; parameter rsrp-ThresholdBFR is an RSRP threshold for the SCell beam failure recovery; pow erRampingStep parameter for the SpCell beam failure recovery; powerRampingStepHighPriority parameter for the SpCell beam failure recovery; preambleReceivedTargetPower parameter for the SpCell beam failure recovery; preambleTransMax parameter for the SpCell beam failure recovery; scalingFactorBl parameter for the SpCell beam failure recovery; ssb-per-RACH-Occasion for the SpCell beam failure recovery using contention-free Random Access Resources; ra-Response Window parameter is the time window to monitor response(s) for the SpCell beam failure recovery using contention-free Random Access Resources; prach-ConfigurationIndex parameter for the SpCell beam failure recovery using contention-free Random Access Resources; ra-ssb-OccasionMasklndex parameter for the SpCell beam failure recovery using contention-free Random Access Resources; ra-OccasionList parameter for the SpCell beam failure recovery using contention-free Random Access Resources; candidateBeamRSList parameter is list of candidate beams for SpCell beam failure recovery; candidateBeamRSSCellList parameter is list of candidate beams for SCell beam failure recovery.

The following UE variables are used for the beam failure detection procedure: BFI_COUNTER (per Serving Cell): counter for beam failure instance indication which is initially set to 0.

For each Serving Cell configured for beam failure detection, and if beam failure instance indication has been received from lower layers, then the MAC entity shall start (or restart) the beamFailureDetectionTimer and increment BFI_COUNTER by 1. Further, if the value of BFI_COUNTER is greater than or equal to the threshold beamFailureInstanceMaxCount;, then the MAC entity shall trigger a BFR for the Serving Cell, if the Serving Cell is Secondary Cell ("SCell"). However, if the Serving Cell is not a SCell (i.e., if the Serving Cell is a Special Cell ("SpCell")), then the MAC entity shall initiate a Random Access procedure on the SpCell. Note that a SpCell may refer to a Primary Cell or a Primary Secondary Cell.

Additionally, for each Serving Cell configured for beam failure detection, if the timer beamFailureDetectionTimer expires or if timer beamFailureDetectionTimer, parameter beamFailureInstanceMaxCount, or any of the reference signals used for beam failure detection is reconfigured by upper layers associated with this Serving Cell, then the MAC entity shall set variable BFI_COUNTER to 0.

If the Serving Cell is SpCell and the Random Access procedure initiated for SpCell beam failure recovery is successfully completed, then the MAC entity shall set BFI_COUNTER to 0, stop the timer beamFailureRecoveryTimer (if configured) and consider the Beam Failure Recovery procedure successfully completed.

Otherwise, if the Serving Cell is SCell, and a PDCCH addressed to C-RNTI indicating uplink grant for a new transmission is received for the Hybrid Automatic Repeat Request ("HARQ") process used for the transmission of the BFR MAC CE or Truncated BFR MAC CE which contains beam failure recovery information of this Serving Cell, or if the SCell is deactivated, then the MAC entity shall set BFI_COUNTER to 0 and consider the Beam Failure Recovery procedure successfully completed and cancel all the triggered BFRs for this Serving Cell.

If the Beam Failure Recovery procedure determines that at least one BFR has been triggered and not cancelled for an SCell for which evaluation of the candidate beams has been completed (e.g., according to the requirements as specified in 3GPP Technical Specification ("TS") 38.133), and if uplink shared channel ("UL-SCH") resources are available for a new transmission and if the UL-SCH resources can accommodate the BFR MAC CE plus its subheader as a result of Logical Channel Prioritization Procedure ("LCP"), then the MAC entity shall instruct the Multiplexing and Assembly procedure to generate the BFR MAC CE.

Otherwise, if the Beam Failure Recovery procedure determines that at least one BFR has been triggered and not cancelled for an SCell for which evaluation of the candidate beams has been completed, and if UL-SCH resources are available for a new transmission and if the UL-SCH resources can accommodate the Truncated BFR MAC CE plus its subheader as a result of LCP, then the MAC entity shall instruct the Multiplexing and Assembly procedure to generate the Truncated BFR MAC CE.

Otherwise, if either no UL-SCH resources are available for a new transmission or if the UL-SCH resources cannot accommodate the BFR MAC CE or truncated BFR MAC CE, then the MAC entity shall trigger the Scheduling Request ("SR") for SCell beam failure recovery for each SCell for which BFR has been triggered, not cancelled, and for which evaluation of the candidate beams has been completed.

All BFRs triggered for an SCell shall be cancelled when a MAC PDU is transmitted and this PDU includes a BFR MAC CE or Truncated BFR MAC CE which contains beam failure information of that SCell.

Regarding link recovery procedures, a UE 205 can be provided, for each Bandwidth Part ("BWP") of a serving cell, a set $\bar{q}_0$ of periodic CSI-RS resource configuration indexes by failureDetectionResources and a set $\bar{q}_1$ of periodic CSI-RS resource configuration indexes and/or Synchronization Signal/Physical Broadcast Channel ("SS/PBCH") block indexes by candidateBeamRSList for radio link quality measurements on the BWP of the serving cell. If the UE 205 is not provided failureDetectionResources, the UE 205 determines the set $\bar{q}_0$ to include periodic CSI-RS resource configuration indexes with same values as the Reference Signal ("RS") indexes in the RS sets indicated by TCI-State for respective Control Resource Sets ("CORESETs") that the UE 205 uses for monitoring PDCCH and, if there are two RS indexes in a Transmission Configuration Indicator ("TCI") state, the set $\bar{q}_0$ includes RS indexes with Quasi-Co-Location ("QCL") Type-D configuration for the corresponding TCI states. The UE 205 expects the set $\bar{q}_0$ to include up to two RS indexes. The UE 205 expects single port RS in the set $\bar{q}_0$.

The thresholds $Q_{out\_LR}$ and $Q_{in\_LR}$ correspond to the default value of rimInSyncOutOfSyncThreshold (e.g., as described in 3GPP TS 38.133 for $Q_{out}$) and to the value provided by rsrp-ThresholdSSB, respectively.

The physical layer in the UE 205 assesses the radio link quality according to the set $\bar{q}_0$ of resource configurations against the threshold $Q_{out\_LR}$. For the set $\bar{q}_0$, the UE 205 assesses the radio link quality only according to periodic CSI-RS resource configurations or SS/PBCH blocks that are quasi co-located, e.g., as described in 3GPP TS 38.214, with the Demodulation Reference Signal ("DM-RS") of PDCCH receptions monitored by the UE 205. The UE 205 applies the $Q_{in\_LR}$ threshold to the Layer-1 Reference Signal Received Power ("$L_1$-RSRP") measurement obtained from a SS/PBCH block. The UE 205 applies the $Q_{in\_LR}$ threshold to the $L_1$-RSRP measurement obtained for a CSI-RS resource after scaling a respective CSI-RS reception power with a value provided by powerControlOffsetSS.

In Discontinuous Reception ("DRX") mode operation, the physical layer provides an indication to higher layers when the radio link quality is worse than the threshold $Q_{out\_LR}$ with a periodicity determined (e.g., as described in 3GPP TS 38.133). In non-DRX mode operation, the physical layer in the UE 205 provides an indication to higher layers when the radio link quality for all corresponding resource configurations in the set $\bar{q}_0$ that the UE 205 uses to assess the radio link quality is worse than the threshold $Q_{out\_LR}$. The physical layer informs the higher layers when the radio link quality is worse than the threshold $Q_{out\_LR}$ with a periodicity determined by the maximum between the shortest periodicity among the periodic CSI-RS configurations and/or SS/PBCH blocks in the set $\bar{q}_0$ that the UE 205 uses to assess the radio link quality and 2 msec.

Upon request from higher layers, the UE 205 provides to higher layers the periodic CSI-RS configuration indexes and/or SS/PBCH block indexes from the set $\bar{q}_1$ and the corresponding $L_1$-RSRP measurements that are larger than or equal to the $Q_{in\_LR}$ threshold.

A UE can be provided a Control Resource Set ("CORESET") through a link to a search space set provided by recoverySearchSpaceId, e.g., as described in 3GPP TS 38.213, for monitoring PDCCH in the CORESET. If the UE 205 is provided recoverySearchSpaceId, the UE 205 does not expect to be provided another search space set for monitoring PDCCH in the CORESET associated with the search space set provided by recoverySearchSpaceId.

The UE 205 may receive by PRACH-ResourceDedicatedBFR, a configuration for Physical Random Access Channel ("PRACH") transmission, e.g., as described in 3GPP TS 38.213. For PRACH transmission in slot n and according to antenna port quasi-co-location parameters associated with periodic CSI-RS resource configuration or with SS/PBCH block associated with index $q_{new}$ provided by higher layers (e.g., as defined in 3GPP TS 38.321), the UE 205 monitors PDCCH in a search space set provided by recoverySearchSpaceId for detection of a Downlink Control Information ("DCI") format with Cyclic Redundancy Check ("CRC") scrambled by C-RNTI or Modulation Coding Scheme C-RNTI ("MCS-C-RNTI") starting from slot n+4 within a window configured by parameter BeamFailureRecoveryConfig.

For PDCCH monitoring in a search space set provided by recoverySearchSpaceId and for corresponding Physical Downlink Shared Channel ("PDCCH") reception, the UE 205 assumes the same antenna port quasi-collocation parameters as the ones associated with index new until the UE 205 receives by higher layers an activation for a TCI state or any of the parameters tci-StatesPDCCH-ToAddList and/or tci-StatesPDCCH-ToReleaseList. After the UE 205 detects a DCI format with CRC scrambled by C-RNTI or MCS-C-RNTI in the search space set provided by recoverySearchSpaceId, the UE 205 continues to monitor PDCCH candidates in the search space set provided by parameter recoverySearchSpaceId until the UE 205 receives a MAC CE activation command for a TCI state or parameter tci- StatesPDCCH-ToAddList and/or parameter tci-StatesPDCCH-ToReleaseList.

After 28 symbols from a last symbol of a first PDCCH reception in a search space set provided by parameter recoverySearchSpaceId for which the UE 205 detects a DCI format with CRC scrambled by C-RNTI or MCS-C-RNTI and until the UE 205 receives an activation command for PUCCH-SpatialRelationInfo (e.g., as defined in 3GPP TS 38.321) or is provided PUCCH-SpatialRelationInfo for Physical Uplink Control Channel ("PUCCH") resource(s), the UE 205 transmits a PUCCH on a same cell as the PRACH transmission using: a same spatial filter as for the last PRACH transmission, and a power determined (e.g., as described in 3GPP TS 38.213) with $q_n=0$, $q_d=q_{new}$, and l=0.

After 28 symbols from a last symbol of a first PDCCH reception in a search space set provided by recoverySearchSpaceId where a UE detects a DCI format with CRC scrambled by C-RNTI or MCS-C-RNTI, the UE 205 assumes same antenna port quasi-collocation parameters as the ones associated with index $q_{new}$ for PDCCH monitoring in a CORESET with index 0.

The following solutions describe enhancements to the procedures and/or signaling for beam failure detection and beam failure recovery. According to a first solution, multiple BFD- and BFR-related procedures can be performed per serving cell for a UE 205 based on multiple groups. In one embodiment, a group could be a geographical region or zone and for each zone, a separate beam failure detection and recovery procedure can be performed. In another embodiment, a group could be based on TRP. In some embodiments, BFD and BFR procedures are performed per group at the physical ("PHY") layer based, e.g., without triggering MAC layer BFD/BFR procedures. In such embodiments, MAC layer BFD and BFR procedures can be initiated when PHY layer-based BFD is detected across all groups for the UE 205.

According to a second solution, shared beam failure detection RS may be configured across multiple UEs that are grouped together to trigger beam failure recovery procedure across all the UEs within the group even when one of the UE within the group indicates the beam failure to the RAN node 207 with following two possibilities: A) Only one UE within the group can be configured to perform beam failure detection and beam failure recovery procedure; B) Multiple UEs within the group can be configured to perform beam failure detection and beam failure recovery procedure where the beam failure instances are shared across the UEs and a single counter for BFI is used across all the UEs within a group.

Note that the grouping of UEs can be based on beam category groups, zones, TRPs, etc. and combination of above solutions is also possible. In various embodiments, the details of shared beam-management and UE grouping are as described in PCT International Application Number PCT/IB2022/051305, titled "CONFIGURING SHARED REFERENCE BEAMS", and filed on Feb. 14, 2022 for Ankit Bhamri, Ali Ramadan Ali, Robin Thomas, Karthikeyan Ganesan, and Hyejung Jung, which application is incorporated herein by reference.

According to a first set of solutions, procedures are implemented for enhancing the beam failure detection and recovery procedure for shared beam management framework where BFD and BFR from one UE could be applied to update new beams for other UE within the group of UEs.

FIG. 4 depicts an exemplary procedure 400 for shared beam failure detection and recovery, according to embodiments of the first set of solutions. The procedure 400 involves the UE 205 and the RAN node 207.

The procedure 400 begins and at Step 1, the UE 205 is configured by the RAN node 207 (e.g., a gNB) with multiple BFD RS sets, multiple BFI counters, and corresponding associations of BFD RS sets and BFI counter to a beam group based on zone (see messaging 405). Alternatively, the association of BFD RS set and BFI counter to a beam group may be based on the UE 205's two-dimensional and/or three-dimensional ("2D/3D") position, its location relative to the RAN node 207, the TRP serving the UE 205, etc.

At Step 2, the UE 205 measures signal strength of BFD RS sets for each group according to the received configuration (see block 410).

At Step 3, the UE 205 increments the associated PI-TY layer BFI counter for any group where the measured signal strength is below a configured threshold (see block 415).

At optional Step 4a, the UE 205 may receive (e.g., using sidelink communication) a BFI indication from at least one first UE in the same UE group (see messaging 420).

At conditional Step 4b, upon receiving the BFI indication from at least one second UE in the same UE group, the UE 205 increments the MAC layer BFI counter (see block 425).

At Step 5, the UE 205 sends BFR MAC CE (i.e., upon declaring BFD for SCell) or initiates RACH procedure (i.e., upon declaring BFD for SpCell) (see messaging 430). The procedure 400 ends.

According to a first embodiment of the first solutions, a UE 205 can be configured with one or multiple BFD RS set that are common or shared across multiple users belonging to a same group. This can be configured with either same UE-specific RRC configuration or one common RRC configuration to multiple UEs. Each of the configured BFD RS set can consist of one or multiple shared/common BFD RS for multiple UEs. The QCL assumption for these BFD RS could either be a shared/common beam ID (same beam for all UEs) or another RS such as CSI-RS/SSB that are also configured with shared/common configuration. In one implementation, the shared BFD RS is configured separately than the radio link monitoring RS.

FIG. 5 depicts an exemplary ASN.1 structure 500 of joint configuration using an EnhancedRadioLinkMonitoringConfig information element. According to an implementation of the first solution, the shared BFD RS can be configured jointly with Radio Link Failure ("RLF") RS configuration, where the configuration is updated such that the detection-Resource parameter 505 can be a shared/common beam/RS, as illustrated in FIG. 5. In some embodiments, the RLF can be based on a UE-specific RS, while the BFD can be based on a shared RS/beam. In alternate embodiments, both the RLF and BFD are based on a shared RS/beam.

In some embodiments, implicit configuration for shared BFD RS is used, where the shared BFD RS is determined based on the shared/common beam/TCI for PDCCH reception of the UEs within the group. If the UE 205 is configured with both UE-specific beam/TCI and shared beam/TCI, then only the shared beam/TCI is used for BFD RS measurements.

According to a second embodiment of the first solutions, a UE 205 is not always expected to be either explicitly or implicitly configured with BFD RS and therefore, that the UE 205 is not required to perform beam failure detection and beam failure recover procedures. Such UE 205 can be referred to as secondary UEs within a group. One or multiple UEs within a group that are configured (explicitly/implicitly) with shared/common BFD RS and can perform BFD and BFR procedure are referred to as primary UE(s) within a group.

In one implementation, the UE 205 is configured as a primary UE and thus is expected to perform BFD and BFR procedures (based on the procedures described above with reference to Beam Failure Detection and Recovery procedure in NR) based on shared beam/RS and the new candidate shared beams are configured to both the primary UE (i.e., UE 205) and other UEs within the same group. If the primary UE 205 is additionally configured with UE-specific BFD RS, then the BFD and BFR procedure corresponding to a UE-specific BFD RS is not shared/applied for candidate beam update to other UEs.

According to a third embodiment of the first solutions, shared/common BFD RS based measurements are done across multiple UEs within the same group and a common beamFailureInstanceMaxCount is applied across all the UEs within the group. In some embodiments, when any one of the one UEs within the group encounters the BFD RS measurement below a configured threshold value ($Q_{out\_LR}$), then the BFI is shared across all UEs in the group. The BFI information can be shared by a groupcast message on SL by the UE 205 that encountered the BFI, where a group ID used for BFI groupcasting is signaled to each UE in the group via RRC configuration.

In one implementation, once the BFI is shared across all the UEs via SL groupcast message, then each UE's PHY layer 211 indicates the BFI to the MAC layer 213 and corresponding beamFailureDetectionTimer is started for all UEs within the group. In some implementation, an additional offset beamFailureDetectionTimerOffset is applied at all the UEs except the source UE that encountered BFI. This offset is used to compensate the delay related to SL groupcast message transmission and reception.

In alternate implementation, when there is at least one primary UE configured within a group and if any of the UEs within a group encounters BFI, then the encountering UE shares the BFI information via a unicast SL message with the primary UE (e.g., the UE 205) and the primary UE indicates the BFI to the MAC and corresponding beamFailureDetectionTimer is started for the primary UE. In this implementation, the BFD RS measurements are utilized from all the UEs within the group, but the BFI indication to the MAC and corresponding BFD and BFR procedures is initiated only by primary UE within a group. Once the beam recovery procedure is finished, then new shared/common candidate beams are configured to all the UEs within the group.

In alternate implementations, a BFI is reported from the PHY layer 211 to the MAC layer 213 by one or multiple UEs within the group only when the measured signal strength on a shared BFD RS is below a configured threshold on at least N number of UEs within the same group. In one implementation, there are total M UEs within a group and out of which N UEs measured the signal strength on the shared BFD RS lower than the configured threshold within a configured time duration and only then is the BFI reported either by the primary UE within that group to the MAC or by all of these N UEs. Accordingly, N PHY layer beam failure instances across N UEs within a group will trigger one BFI indicated to MAC layer 213.

In some embodiments, the threshold of N number of UEs can be configured to be variable based on the QoS requirement for each UE. For example, BFI is triggered/indicated after small number of BFDs from the UEs with URLLC service, while the BFI triggering is relaxed for the case of eMBB service, i.e., requiring a higher number of UEs to detected BF. The main requirement here is that the information about PHY layer BFI is shared across all UEs within a group or at least with a primary UE (if configured/defined) via SL groupcast or unicast.

According to a fourth embodiment of the first solutions, the shared/common BFD RS based measurements are done across multiple UEs within the same group and a common beamFailureInstanceMaxCount is applied across all the UEs within the group. In some implementations of the fourth embodiment, when any one of the UEs within the group encounters the BFD RS measurement below a configured threshold value ($Q_{out\_LR}$), then the BFI is shared across all UEs through the RAN node 207. The BFI information can be shared by the UE that encountered it to the RAN node 207, e.g., via UL control information ("UCI"), and then the RAN node 207 can share the corresponding information with either all the UEs within the group via group-common DCI or share the information with only the primary UE (if defined/specified).

In another implementation of the fourth embodiment, the BFI is shared by the UE that encountered BFD with the primary UE and primary UE shares it with the RAN node 207 that groupcasts it across all UEs. The primary UE may decide on sharing the BFI with the RAN node 207, e.g., based on the number of secondary UEs that encountered the BFD.

Different implementations/variations described in fourth embodiment of the first solutions can also be applied here by using RAN-based UL/DL signaling to share information across multiple UEs within a group instead of SL assistance or in addition to SL assistance. Please note that grouping of UEs here may be different than zone/region and beam category grouping described below and may be different than the grouping described in International Application PCT/IB2022/051305.

According to a second set of solutions, procedures are implemented for supporting zone/region-based beam failure detection and recovery procedure for a UE 205.

FIG. 6 depicts an exemplary procedure 600 for zone-based beam failure detection and recovery, according to embodiments of the second set of solutions. The procedure 600 involves the UE 205 and the RAN node 207.

The procedure 600 begins and at Step 1, the UE 205 is configured by the RAN node 207 (e.g., a gNB) with multiple BFD RS sets, multiple BFI counters, and corresponding associations of BFD RS sets and BFI counter to a beam group based on zone (see messaging 605). Alternatively, the association of BFD RS set and BFI counter to a beam group may be based on the UE 205's two-dimensional and/or three-dimensional ("2D/3D") position, its location relative to the RAN node 207, the TRP serving the UE 205, etc.

At Step 2, the UE 205 measures signal strength of BFD RS sets for each group according to the received configuration (see block 610).

At Step 3, the UE 205 increments the associated PHY layer BFI counter for any group where the measured signal strength is below a configured threshold (see block 615).

At Step 4, the UE 205 increments the MAC layer BFI counter only when the PHY layer BFI counter for each group reaches a configured maximum value (see block 620).

At Step 5, the UE 205 sends BFR MAC CE (i.e., upon declaring BFD for SCell) or initiates random access ("RACH") procedure (i.e., upon declaring BFD for SpCell) (see messaging 625). The procedure 600 ends.

According to a first embodiment of the second solutions, a UE 205 can be configured with multiple BFD RS sets, where one or multiple BFD RS sets can be grouped together, where the grouping can be done based on geographical zone or area, 2D/3D position coordinates, TRP association or a combination thereof.

In some implementations, the BFD RS is configured explicitly to a UE 205 where grouping of BFD RS is either explicitly indicated as part of the configuration or can be implicitly determined based on detection resource. In one implementation, when the detection resource is associated with a beam/RS that is quasi-co-located ("QCL'ed") with a Control Resource Set ("CORESET") configured to the UE 205 and wherein the CORESET belongs to a TRP (for example, based on CORESETPoolIndex value). Here, the type of quasi-co-location ("QCL") may be QCL Type-D. Note that two antenna ports are said to be quasi-co-located if properties of the channel over which a symbol on one antenna port is conveyed can be inferred from the channel over which a symbol on the other antenna port is conveyed.

In another implementation, the grouping is based on the location/position coordinates (e.g., either absolute or relative to the RAN node 207) and/or on the zone IDs. Basically, for each group, there can be a dedicated BFD and BFR procedure (either partially or completely). In the case of zone configurations, the size of each zone may also be configurable based on the BFD RS grouping requirements. In one implementation the zone may be considered rectangular with configured lengths and widths of each zone, while in other implementations other zone shapes with associated geometrical parameters may be considered such as square zone, trapezoidal zones, etc. The zone configuration may also be signaled via system information broadcast to the UE 205 (and/or to group of UEs) in advance before the BFD RS to zone mapping configuration is provided.

In one implementation, when implicit BFD RS is configured, then if a sequence of beam/RS is configured for PDCCH (and/or other DL channels/signals) with corresponding application time, then the BFD RS is also updated accordingly. For example, if slot 1 has PDCCH with beam/TCI state 1, then BFD RS measurement is based on beam/TCI 1 and if slot 2 has PDCCH with beam/TCI 2, then the BFD RS measurement is based on beam/TCI state 2. In this case, the grouping is basically for each beam within a sequence or can be set of beams within the sequence. This grouping could be realized based on location and/or TRP to which the beams are associated.

According to a second embodiment of the second solutions, when multiple BFD RS (sets) are configured that are associated/separate in different groups, then each group can be associated with separate BFI counter and corresponding beamFailureDetectionTimer such that the BFD and BFR procedure for each group can be done separately.

In one implementation, the same procedure as currently described above with reference to Beam Failure Detection and Recovery procedure in NR can be followed for each group except that if the beam failure is detected only for a subset of groups, i.e., the current beam is above the threshold (for declaring BFI) for at least one of the groups, then the RACH procedure is not initiated and only the BFR for the groups that reported BFD is followed. The UE 205 can signal and request for new candidate beams for the group for which BFD is declared by using the beams from other groups for which there is no BFD. In this case, the RAN node 207 can configure new candidate beams for the groups where BFD is detected. Basically, BFD on one group, but BFR procedure is initiated with the assistance from another group.

In one exemplary implementation, when the grouping is done based on TRPs, then if BFD is declared for one TRP, while there is no BFD for other TRP, then the BFR procedure can be initiated by using the other TRP that still has valid beams for the UE 205. The UE 205 can utilize the UL channel transmission to other TRP for indicating BFD to the RAN node 207 and the RAN node 207 can then configure new set of beams for the first TRP.

In some embodiments, a PHY layer BFI counter is configured to the UE 205 where the BFD is indicated to the RAN node 207 only at the PHY layer 211 without the need to indicate BFI to the MAC layer 213. Therefore, the UE 205 can be configured with multiple PHY layer BFI counter and one MAC layer BFI counter. If at least one of the PHY BFI counter is zero ('0'), then the BFI is not indicated to the MAC layer 213 and therefore BFD/BFR related procedure is not initiated by the MAC layer 213. However, when all the PHY BFI counters are greater than zero ('0') within a certain time duration (e.g., while timer beamFailureDetectionTimer is running and not expired), then the UE 205's PHY layer 211 indicates BFI to the MAC layer 213 and therefore BFD/BFR procedure as described above with reference to Beam Failure Detection and Recovery procedure in NR is performed. Note that the grouping of the second set of solutions may be based on beam category. In one embodiment, the beam category grouping for the second solutions follows the grouping considered in International Application Number PCT/IB2022/051305.

According to a third solution, a UE 205 can be configured with shared BFD RS and multiple groups where each group can be associated with at least one set of BFD RS, wherein different implementations/variations described in the first solution set and in the second solution set can be applied together with different combinations. For example, UEs that belong to a certain zone ID can be grouped into sub-groups based on their service, the TRP they are connected to or other common parameters. As another example, UEs belong to different/adjacent zone IDs can be grouped together based on their service, the TRP they are connected to or other common parameters. Please note that grouping here may be different than beam category group considered in the second solution set or in International Application Number PCT/IB2022/051305.

In some embodiments of the third solution, the UE 205 may be configured with one location-dependent common/shared TCI state table and also with a UE-specific TCI state table. Here, the UE 205 could switch between common/shared TCI state table and UE-specific state table after reporting 'N' BFI.

In another implementation of the third solution, BFR could switch from common/shared TCI stable table with that of UE-specific state table. In another implementation. Here, the UE 205 could switch common/shared TCI stable table with that of UE-specific state table after receiving 'N' consecutive NACKs or decoding failure. In another implementation of the third solution, the UE 205 could request switching by either transmitting a SR—otherwise a Sounding Reference Signal ("SRS"), in this case, each of this TCI state table could be associated with a SR configuration and/or SRS configuration.

As used herein, the terms "antenna," "panel," "antenna panel," "device panel" and "UE panel" are used interchangeably. An antenna panel may be a hardware that is used for transmitting and/or receiving radio signals at frequencies lower than 6 GHz, e.g., frequency range 1 ("FR1"), or higher than 6 GHz, e.g., frequency range 2 ("FR2") or millimeter wave (i.e., "mmWave"). In some embodiments, an antenna panel may comprise an array of antenna elements, wherein each antenna element is connected to hardware such as a phase shifter that allows a control module to apply spatial parameters for transmission and/or reception of signals. The resulting radiation pattern may be called a beam, which may or may not be unimodal and may allow the device to amplify signals that are transmitted or received from spatial directions.

In some embodiments, an antenna panel may or may not be virtualized as an antenna port in the specifications. An antenna panel may be connected to a baseband processing module through a Radio Frequency ("RF") chain for each of transmission (egress) and reception (ingress) directions. A capability of a device in terms of the number of antenna panels, their duplexing capabilities, their beamforming capabilities, and so on, may or may not be transparent to other devices. In some embodiments, capability information may be communicated via signaling or, in some embodiments, capability information may be provided to devices without a need for signaling. In the case that such information is available to other devices, it can be used for signaling or local decision making.

In some embodiments, a device antenna panel (e.g., of a UE or RAN node) may be a physical or logical antenna array comprising a set of antenna elements or antenna ports that share a common or a significant portion of an RF chain (e.g., in-phase/quadrature ("I/Q") modulator, analog-to-digital ("A/D") converter, local oscillator, phase shift network). The device antenna panel or "device panel" may be a logical entity with physical device antennas mapped to the logical entity. The mapping of physical device antennas to the logical entity may be up to device implementation. Communicating (receiving or transmitting) on at least a subset of antenna elements or antenna ports active for radiating energy (also referred to herein as active elements) of an antenna panel requires biasing or powering on of the RF chain which results in current drain or power consumption in the device associated with the antenna panel (including power amplifier/low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In some embodiments, depending on device's own implementation, a "device panel" can have at least one of the following functionalities as an operational role of Unit of antenna group to control its transmit ("Tx") beam independently, Unit of antenna group to control its transmission power independently, Unit of antenna group to control its transmission timing independently. The "device panel" may be transparent to gNB. For certain condition(s), gNB or network can assume the mapping between device's physical antennas to the logical entity "device panel" may not be changed. For example, the condition may include until the next update or report from device or comprise a duration of time over which the gNB assumes there will be no change to the mapping.

A device may report its capability with respect to the "device panel" to the gNB or network. The device capability may include at least the number of "device panels." In one implementation, the device may support uplink ("UL") transmission from one beam within a panel; with multiple panels, more than one beam (one beam per panel) may be used for UL transmission. In another implementation, more than one beam per panel may be supported/used for UL transmission.

In some of the embodiments described, an antenna port is defined such that the channel over which a symbol on the antenna port is conveyed can be inferred from the channel over which another symbol on the same antenna port is conveyed. Two antenna ports are said to be quasi-co-located if the large-scale properties of the channel over which a symbol on one antenna port is conveyed can be inferred from the channel over which a symbol on the other antenna port is conveyed. For example, two signals 'A' and 'B' are transmitted by the same TRP (Antenna Array) applying same spatial filter would experience similar channel conditions and thus have similar channel properties. Because of this, when the receiver side (e.g., UE) detects signal 'A' and ascertains channel properties of the received signal, it can apply the channel properties of signal 'A' to detect and decode signal 'B' due to signals 'A' and 'B' being quasi-co-located.

The large-scale channel properties include one or more of delay spread, Doppler spread, Doppler shift, average gain, average delay, and spatial receive ("Rx") parameters. Two antenna ports may be quasi-co-located with respect to a subset of the large-scale properties and different subset of large-scale properties may be indicated by a quasi-co-location ("QCL") Type. For example, qcl-Type may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}.

Spatial Rx parameters (e.g., for beam forming) may include one or more of: angle of arrival ("AoA"), Dominant AoA, average AoA, angular spread, Power Angular Spectrum ("PAS") of AoA, average angle of departure ("AoD"), PAS of AoD, transmit/receive channel correlation, transmit/receive beamforming, spatial channel correlation, etc.

An "antenna port" according to an embodiment may be a logical port that may correspond to a beam (resulting from beamforming) or may correspond to a physical antenna on a device. In some embodiments, a physical antenna may map directly to a single antenna port, in which an antenna port corresponds to an actual physical antenna. Alternately, a set or subset of physical antennas, or antenna set or antenna array or antenna sub-array, may be mapped to one or more antenna ports after applying complex weights, a cyclic delay, or both to the signal on each physical antenna. The physical antenna set may have antennas from a single module or panel or from multiple modules or panels. The weights may be fixed as in an antenna virtualization scheme, such as cyclic delay diversity ("CDD"). The procedure used to derive antenna ports from physical antennas may be specific to a device implementation and transparent to other devices.

In some of the embodiments described, a TCI-state associated with a target transmission can indicate parameters for configuring a QCL relationship between the target transmission (e.g., target reference signal ("RS") of Demodulation RS ("DM-RS") ports of the target transmission during a transmission occasion) and a source reference signal(s) (e.g., Synchronization Signal Block ("SSB"), Channel State Information Reference Signal ("CSI-RS"), and/or Sounding Reference Signal ("SRS")) with respect to QCL type parameter(s) indicated in the corresponding TCI state. A device can receive a configuration of a plurality of TCI states for a serving cell for transmissions on the serving cell.

In some of the embodiments described, a spatial relation information associated with a target transmission can indicate parameters for configuring a spatial setting between the target transmission and a reference RS (e.g., SSB/CSI-RS/SRS). For example, the device may transmit the target transmission with the same spatial domain filter used for reception the RS (e.g., downlink ("DL") RS such as SSB/CSI-RS). In another example, the device may transmit the target transmission with the same spatial domain transmission filter used for the transmission of the RS (e.g., UL RS such as SRS). A device can receive a configuration of a plurality of spatial relation information configurations for a serving cell for transmissions on the serving cell.

Figure 7:
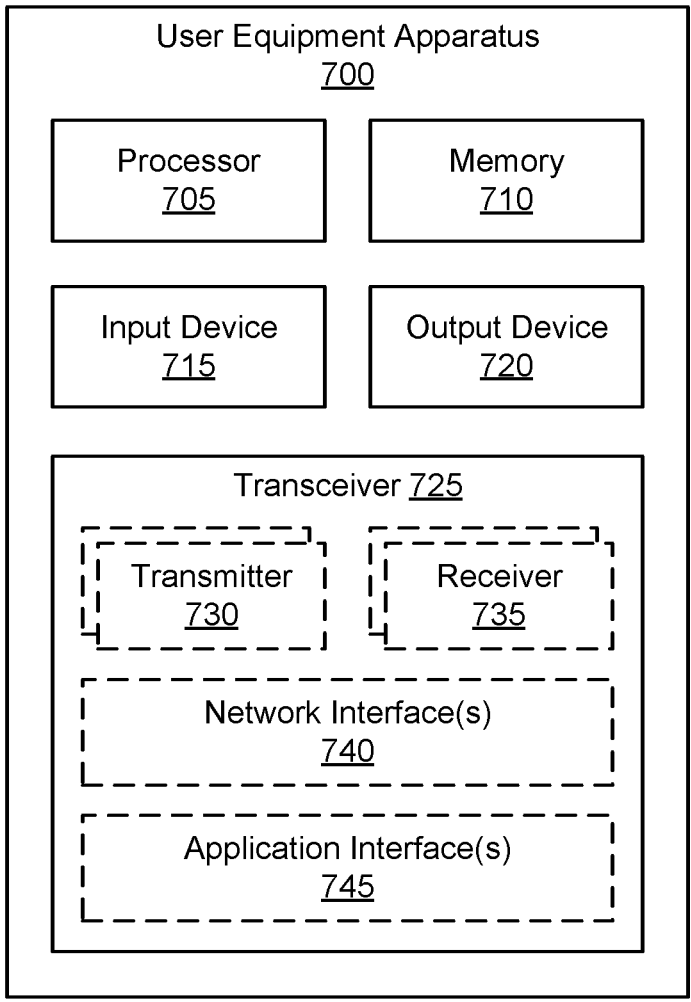
FIG. 7 is a block diagram illustrating one embodiment of a user equipment apparatus that may be used for shared beam failure detection and recovery.

FIG. 7 depicts a user equipment apparatus 700 that may be used for shared beam failure detection and recovery, according to embodiments of the disclosure. In various embodiments, the user equipment apparatus 700 is used to implement one or more of the solutions described above. The user equipment apparatus 700 may be one embodiment of the remote unit 105 and/or the UE 205, described above. Furthermore, the user equipment apparatus 700 may include a processor 705, a memory 710, an input device 715, an output device 720, and a transceiver 725.

In some embodiments, the input device 715 and the output device 720 are combined into a single device, such as a touchscreen. In certain embodiments, the user equipment apparatus 700 may not include any input device 715 and/or output device 720. In various embodiments, the user equipment apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. In some embodiments, the transceiver 725 communicates with one or more cells (or wireless coverage areas) supported by one or more base units 121. In various embodiments, the transceiver 725 is operable on unlicensed spectrum. Moreover, the transceiver 725 may include multiple UE panels supporting one or more beams. Additionally, the transceiver 725 may support at least one network interface 740 and/or application interface 745. The application interface(s) 745 may support one or more APIs. The network interface(s) 740 may support 3GPP reference points, such as Uu, N1, PC5, etc. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the processor 705 controls the user equipment apparatus 700 to implement the above described UE behaviors. In certain embodiments, the processor 705 may include an application processor (also known as "main processor") which manages application-domain and operating system ("OS") functions and a baseband processor (also known as "baseband radio processor") which manages radio functions.

In various embodiments, via the transceiver 725, the processor 705 receives a configuration from a RAN for a set of shared BFD RS, where the set of shared BFD RS is quasi-co-located with a set of shared UE Rx beams applicable to a group of UEs. The processor 705 measures a signal strength on the set of shared BFD RS and increments a shared BFI counter by one in response to the measured signal strength being below a BFD RS threshold value. The processor 705 increments the shared BFI counter by one in response to receiving a BFI indication from a UE in the group of UEs and declares BFD for the group of UEs in response to the shared BFI counter reaching a maximum value of beam failure.

In some embodiments, declaring BFD includes initiating a random-access procedure by MAC layer in response to the shared BFI counter reaching a maximum value of beam failure. In some embodiments, the configuration for the set of shared BFD RS indicates the BFD RS threshold value and the maximum value of beam failure.

In some embodiments, the transceiver 725 further transmits a second BFI indication to all UEs in the group of UEs in response to the measured signal strength being below the BFD RS threshold value. In certain embodiments, transmitting the second BFI indication to all UEs comprises transmitting the second BFI indication via sidelink unicast messaging, sidelink groupcast messaging, or combinations thereof.

In some embodiments, the configuration for the set of shared BFD RS comprises an indication that the UE is configured as a primary UE within the group of UEs, where the primary UE declares BFD for itself and at least one second UE belonging to the group of UEs, and where the primary UE initiates beam failure recovery for itself and the at least one second UE. In certain embodiments, the second UE is configured as secondary UE that signals the BFI indication to the group of UEs configured with the set of shared Rx beams, but does not declare BFD for itself or any other UE belonging to the group of UEs.

In some embodiments, the transceiver 725 further receives a configuration from the RAN for multiple sets of BFD RS, multiple BFI counters, and an association of at least one BFD RS set and a corresponding BFI counter to one of a plurality of RS groups. In certain embodiments, declaring BFD for the group of UEs occurs in response to the BFI counter reaching a maximum value of beam failure counter for each RS group comprising a shared BFD RS. In further embodiments, the processor 705 may also declare UE-specific BFD in response to the BFI counter reaching a maximum value of beam failure counter for each RS group comprising a non-shared to BFD RS.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to shared beam failure detection and recovery. For example, the memory 710 may store various parameters, panel/beam configurations, resource assignments, policies, and the like as described above. In certain embodiments, the memory 710 also stores program code and related data, such as an operating system or other controller algorithms operating on the apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 720 may include a wearable display separate from, but communicatively coupled to, the rest of the user equipment apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, the output device 720 may be located near the input device 715.

The transceiver 725 communicates with one or more network functions of a mobile communication network via one or more access networks. The transceiver 725 operates under the control of the processor 705 to transmit messages, data, and other signals and also to receive messages, data, and other signals. For example, the processor 705 may selectively activate the transceiver 725 (or portions thereof) at particular times in order to send and receive messages.

The transceiver 725 includes at least transmitter 730 and at least one receiver 735. One or more transmitters 730 may be used to provide UL communication signals to a base unit 121, such as the UL transmissions described herein. Similarly, one or more receivers 735 may be used to receive DL communication signals from the base unit 121, as described herein. Although only one transmitter 730 and one receiver 735 are illustrated, the user equipment apparatus 700 may have any suitable number of transmitters 730 and receivers 735. Further, the transmitter(s) 730 and the receiver(s) 735 may be any suitable type of transmitters and receivers. In one embodiment, the transceiver 725 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 725, transmitters 730, and receivers 735 may be implemented as physically separate components that access a shared hardware resource and/or software resource, such as for example, the network interface 740.

In various embodiments, one or more transmitters 730 and/or one or more receivers 735 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 730 and/or one or more receivers 735 may be implemented and/or integrated into a multi-chip module. In some embodiments, other components such as the network interface 740 or other hardware components/circuits may be integrated with any number of transmitters 730 and/or receivers 735 into a single chip. In such embodiment, the transmitters 730 and receivers 735 may be logically configured as a transceiver 725 that uses one more common control signals or as modular transmitters 730 and receivers 735 implemented in the same hardware chip or in a multi-chip module.

Figure 8:
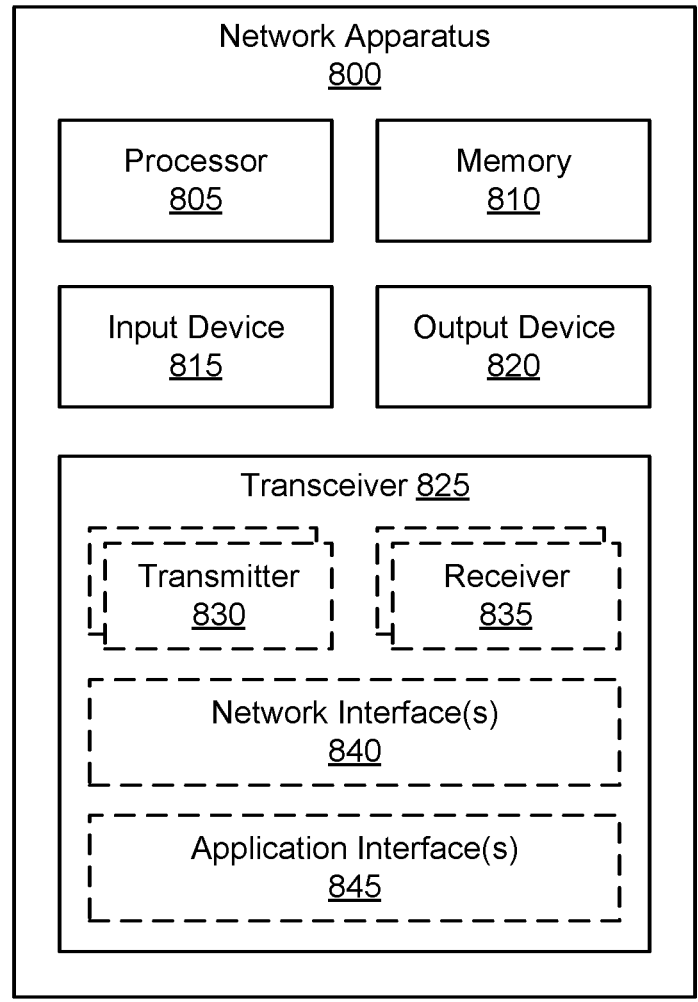
FIG. 8 is a block diagram illustrating one embodiment of a network apparatus that may be used for shared beam failure detection and recovery.

FIG. 8 depicts a network apparatus 800 that may be used for shared beam failure detection and recovery, according to embodiments of the disclosure. In one embodiment, network apparatus 800 may be one implementation of a RAN device, such as the base unit 121 and/or RAN node 207, described above. Furthermore, the network apparatus 800 may include a processor 805, a memory 810, an input device 815, an output device 820, and a transceiver 825.

In some embodiments, the input device 815 and the output device 820 are combined into a single device, such as a touchscreen. In certain embodiments, the network apparatus 800 may not include any input device 815 and/or output device 820. In various embodiments, the network apparatus 800 may include one or more of: the processor 805, the memory 810, and the transceiver 825, and may not include the input device 815 and/or the output device 820.

As depicted, the transceiver 825 includes at least one transmitter 830 and at least one receiver 835. Here, the transceiver 825 communicates with one or more remote units 105. Additionally, the transceiver 825 may support at least one network interface 840 and/or application interface 845. The application interface(s) 845 may support one or more APIs. The network interface(s) 840 may support 3GPP reference points, such as Uu, N1, N2 and N3. Other network interfaces 840 may be supported, as understood by one of ordinary skill in the art.

The processor 805, in one embodiment, may include any known controller capable of executing computer-readable instructions and/or capable of performing logical operations. For example, the processor 805 may be a microcontroller, a microprocessor, a CPU, a GPU, an auxiliary processing unit, a FPGA, or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825.

In various embodiments, the network apparatus 800 is a RAN node (e.g., gNB) that communicates with one or more UEs, as described herein. In such embodiments, the processor 805 controls the network apparatus 800 to perform the above described RAN behaviors. When operating as a RAN node, the processor 805 may include an application processor (also known as "main processor") which manages application-domain and operating system ("OS") functions and a baseband processor (also known as "baseband radio processor") which manages radio functions.

In various embodiments, via the transceiver 825, the processor 805 configures a UE for a set of shared BFD RS, where the set of shared BFD RS is quasi-co-located with a set of shared UE Rx beams applicable to a group of UEs. The transceiver 825 transmits one or more shared BFD RS and receives a BFD indication from the UE for group of UEs. The processor 805 configures the group of UEs with new candidate beams in response to the BFD indication.

In some embodiments, the configuration for shared BFD RS configures the UE as a primary UE, where the primary UE declares BFD for itself and at least one second UE belonging to the group of UEs, and where the primary UE initiates beam failure recovery for itself and the at least one second UE.

In some embodiments, the configuration for shared BFD RS configures the UE as a secondary UE, where the secondary UE signals the BFI indication to the group of UEs configured with the set of shared Rx beams, but does not declare BFD for itself or any other UE belonging to the group of UEs.

In some embodiments, the configuration for the set of shared BFD RS indicates the BFD RS threshold value and the maximum value of beam failure. In some embodiments, the transceiver 825 further transmits a configuration to the UE for multiple sets of BFD RS, multiple BFI counters, and an association of at least one BFD RS set and a corresponding BFI counter to one of a plurality of RS groups.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to shared beam failure detection and recovery. For example, the memory 810 may store parameters, configurations, resource assignments, policies, and the like, as described above. In certain embodiments, the memory 810 also stores program code and related data, such as an operating system or other controller algorithms operating on the apparatus 800.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display separate from, but communicatively coupled to, the rest of the network apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, the output device 820 may be located near the input device 815.

The transceiver 825 includes at least transmitter 830 and at least one receiver 835. One or more transmitters 830 may be used to communicate with the UE, as described herein. Similarly, one or more receivers 835 may be used to communicate with network functions in the Public Land Mobile Network ("PLMN") and/or RAN, as described herein. Although only one transmitter 830 and one receiver 835 are illustrated, the network apparatus 800 may have any suitable number of transmitters 830 and receivers 835. Further, the transmitter(s) 830 and the receiver(s) 835 may be any suitable type of transmitters and receivers.

FIG. 9 depicts one embodiment of a method 900 for shared beam failure detection and recovery, according to embodiments of the disclosure. In various embodiments, the method 900 is performed by a UE device, such as the remote unit 105, the UE 205, and/or the user equipment apparatus 700, described above as described above. In some embodiments, the method 900 is performed by a processor, such as a microcontroller, a microprocessor, a CPU, a GPU, an auxiliary processing unit, a FPGA, or the like.

The method 900 begins and receives 905 a configuration from a RAN for a set of shared BFD RS, where the set of shared BFD RS is quasi-co-located with a set of shared UE Rx beams applicable to a group of UEs. The method 900 includes measuring 910 a signal strength on the set of shared BFD RS. The method 900 includes incrementing 915 a shared BFI counter by one in response to the measured signal strength being below a BFD RS threshold value. The method 900 includes incrementing 920 the shared BFI counter by one in response to receiving a BFI indication from a UE in the group of UEs. The method 900 includes declaring 925 BFD for the group of UEs in response to the shared BFI counter reaching a maximum value of beam failure. The method 900 ends.

Figure 10:
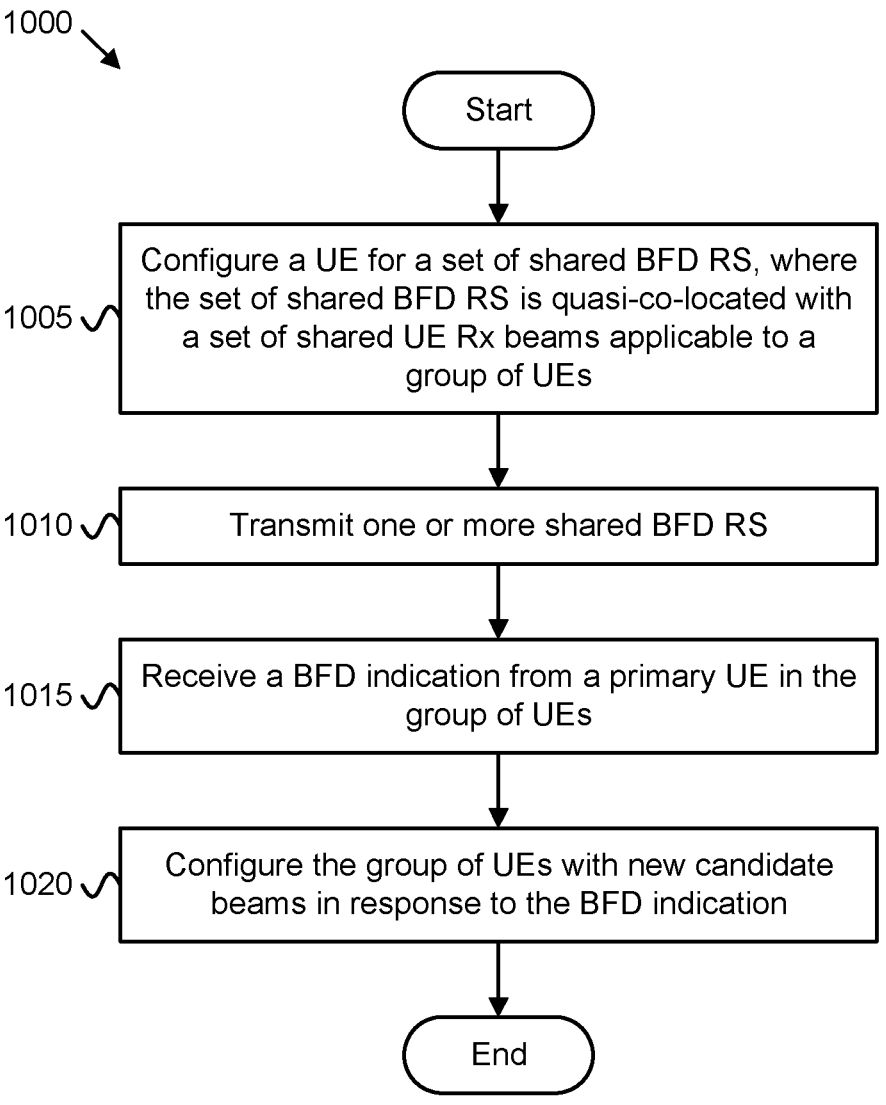
FIG. 10 is a flowchart diagram illustrating one embodi-ment of a second method for shared beam failure detection and recovery.

FIG. 10 depicts one embodiment of a method 1000 for shared beam failure detection and recovery, according to embodiments of the disclosure. In various embodiments, the method 1000 is performed by a network entity, such as the base unit 121, the RAN node 207, and/or the network apparatus 800, described above as described above. In some embodiments, the method 1000 is performed by a processor, such as a microcontroller, a microprocessor, a CPU, a GPU, an auxiliary processing unit, a FPGA, or the like.

The method 1000 begins and configures 1005 a UE for a set of shared BFD RS, where the set of shared BFD RS is quasi-co-located with a set of shared UE Rx beams applicable to a group of UEs. The method 1000 includes transmitting 1010 one or more shared BFD RS. The method 1000 includes receiving 1015 a BFD indication from a primary UE in the group of UEs. The method 1000 includes configuring 1020 the group of UEs with new candidate beams in response to the BFD indication. The method 1000 ends.

Disclosed herein is a first apparatus for shared beam failure detection and recovery, according to embodiments of the disclosure. The first apparatus may be implemented by a UE device, such as the remote unit 105, the UE 205, and/or the user equipment apparatus 700, described above. The first apparatus includes a processor and a transceiver that receives a configuration from a RAN for a set of shared BFD RS, where the set of shared BFD RS is quasi-co-located with a set of shared UE Rx beams applicable to a group of UEs. The processor measures a signal strength on the set of shared BFD RS and increments a shared BFI counter by one in response to the measured signal strength being below a BFD RS threshold value. The processor increments the shared BFI counter by one in response to receiving a BFI indication from a UE in the group of UEs and declares BFD for the group of UEs in response to the shared BFI counter reaching a maximum value of beam failure.

In some embodiments, declaring BFD includes initiating a random-access procedure by MAC layer in response to the shared BFI counter reaching a maximum value of beam failure. In some embodiments, the configuration for the set of shared BFD RS indicates the BFD RS threshold value and the maximum value of beam failure.

In some embodiments, the transceiver further transmits a second BFI indication to all UEs in the group of UEs in response to the measured signal strength being below the BFD RS threshold value. In certain embodiments, transmitting the second BFI indication to all UEs comprises transmitting the second BFI indication via sidelink unicast messaging, sidelink groupcast messaging, or combinations thereof.

In some embodiments, the configuration for the set of shared BFD RS comprises an indication that the UE is configured as a primary UE within the group of UEs, where the primary UE declares BFD for itself and at least one second UE belonging to the group of UEs, and where the primary UE initiates beam failure recovery for itself and the at least one second UE. In certain embodiments, the second UE is configured as secondary UE that signals the BFI indication to the group of UEs configured with the set of shared Rx beams, but does not declare BFD for itself or any other UE belonging to the group of UEs.

In some embodiments, the transceiver further receives a configuration from the RAN for multiple sets of BFD RS, multiple BFI counters, and an association of at least one BFD RS set and a corresponding BFI counter to one of a plurality of RS groups. In certain embodiments, declaring BFD for the group of UEs occurs in response to the BFI counter reaching a maximum value of beam failure counter for each RS group comprising a shared BFD RS. In further embodiments, the processor may also declare UE-specific BFD in response to the BFI counter reaching a maximum value of beam failure counter for each RS group comprising a non-shared BFD RS.

Disclosed herein is a first method for shared beam failure detection and recovery, according to embodiments of the disclosure. The first method may be performed by a UE device, such as the remote unit 105, the UE 205, and/or the user equipment apparatus 700, described above. The first method includes receiving a configuration from a RAN for a set of shared BFD RS and measuring a signal strength on the set of shared BFD RS, where the set of shared BFD RS is quasi-co-located with a set of shared UE Rx beams applicable to a group of UEs. The first method includes incrementing a shared BFI counter by one in response to the measured signal strength being below a BFD RS threshold value and also incrementing the shared BFI counter by one in response to receiving a BFI indication from a UE in the group of UEs. The first method includes declaring BFD for the group of UEs in response to the shared BFI counter reaching a maximum value of beam failure.

In some embodiments, declaring BFD includes initiating a random-access procedure by MAC layer in response to the shared BFI counter reaching a maximum value of beam failure. In some embodiments, the configuration for the set of shared BFD RS indicates the BFD RS threshold value and the maximum value of beam failure.

In some embodiments, the first method further includes transmitting a second BFI indication to all UEs in the group of UEs in response to the measured signal strength being below the BFD RS threshold value. In certain embodiments, transmitting the second BFI indication to all UEs comprises transmitting the second BFI indication via sidelink unicast messaging, sidelink groupcast messaging, or combinations thereof.

In some embodiments, the configuration for the set of shared BFD RS comprises an indication that the UE is configured as a primary UE within the group of UEs, where the primary UE declares BFD for itself and at least one second UE belonging to the group of UEs, and where the primary UE initiates beam failure recovery for itself and the at least one second UE. In certain embodiments, the second UE is configured as secondary UE that signals the BFI indication to the group of UEs configured with the set of shared Rx beams, but does not declare BFD for itself or any other UE belonging to the group of UEs.

In some embodiments, the first method further includes receiving a configuration from the RAN for multiple sets of BFD RS, multiple BFI counters, and an association of at least one BFD RS set and a corresponding BFI counter to one of a plurality of RS groups. In certain embodiments, declaring BFD for the group of UEs occurs in response to the BFI counter reaching a maximum value of beam failure counter for each RS group comprising a shared BFD RS. In further embodiments, the first method may also include declaring UE-specific BFD in response to the BFI counter reaching a maximum value of beam failure counter for each RS group comprising a non-shared BFD RS.

Disclosed herein is a second apparatus for shared beam failure detection and recovery, according to embodiments of the disclosure. The second apparatus may be implemented by a network entity, such as the base unit 121, the RAN node 207, and/or the network apparatus 800, described above. The second apparatus includes a processor that configures a UE for a set of shared BFD RS, where the set of shared BFD RS is quasi-co-located with a set of shared UE Rx beams applicable to a group of UEs. The second apparatus includes a transmitter that transmits one or more shared BFD RS and a receiver that receives a BFD indication from the UE for group of UEs, where the processor configures the group of UEs with new candidate beams in response to the BFD indication.

In some embodiments, the configuration for shared BFD RS configures the UE as a primary UE, where the primary UE declares BFD for itself and at least one second UE belonging to the group of UEs, and where the primary UE initiates beam failure recovery for itself and the at least one second UE.

In some embodiments, the configuration for shared BFD RS configures the UE as a secondary UE, where the secondary UE signals the BFI indication to the group of UEs configured with the set of shared Rx beams, but does not declare BFD for itself or any other UE belonging to the group of UEs.

In some embodiments, the configuration for the set of shared BFD RS indicates the BFD RS threshold value and the maximum value of beam failure. In some embodiments, the transmitter further transmits a configuration to the UE for multiple sets of BFD RS, multiple BFI counters, and an association of at least one BFD RS set and a corresponding BFI counter to one of a plurality of RS groups.

Disclosed herein is a second method for shared beam failure detection and recovery, according to embodiments of the disclosure. The second method may be performed by a network entity, such as the base unit 121, the RAN node 207, and/or the network apparatus 800, described above. The second method includes transmitting a configuration to a UE for a set of shared BFD RS, where the set of shared BFD RS is quasi-co-located with a set of shared UE Rx beams applicable to a group of UEs. The second method includes transmitting one or more shared BFD RS and receiving a BFD indication from a primary UE in the group of UEs. The second method includes configuring the group of UEs with new candidate beams in response to the BFD indication.

In some embodiments, the configuration for shared BFD RS configures the UE as a primary UE, where the primary UE declares BFD for itself and at least one second UE belonging to the group of UEs, and where the primary UE initiates beam failure recovery for itself and the at least one second UE.

In some embodiments, the configuration for shared BFD RS configures the UE as a secondary UE, where the secondary UE signals the BFI indication to the group of UEs configured with the set of shared Rx beams, but does not declare BFD for itself or any other UE belonging to the group of UEs.

In some embodiments, the configuration for the set of shared BFD RS indicates the BFD RS threshold value and the maximum value of beam failure. In some embodiments, the second method further includes transmitting a configuration to the UE for multiple sets of BFD RS, multiple BFI counters, and an association of at least one BFD RS set and a corresponding BFI counter to one of a plurality of RS groups.

Disclosed herein is a third apparatus for location-based beam failure detection and recovery, according to embodiments of the disclosure. The third apparatus may be implemented by a UE device, such as the remote unit 105, the UE 205, and/or the user equipment apparatus 700, described above. The third apparatus includes a processor and a transceiver that receives a configuration from a RAN for multiple sets of BFD RS, multiple BFI counters, and an association of at least one BFD RS set and a corresponding BFI counter to one of a plurality of groups. The processor measures a signal strength on the BFD RS for each group and compares the measured signal strength with a BFD RS threshold value. The processor increments the BFI counter associated with a particular group by one if the measured signal strength is below the threshold value and initiates a random-access procedure by MAC layer in response to the BFI counter reaching a maximum value of beam failure counter for each group.

In some embodiments, initiating a random-access procedure by the MAC layer occurs only when the BFI counter for each group reaches a network-configured maximum value of beam failure counter. In some embodiments, the group is defined based on at least one attribute selected from: a UE position relative to a RAN node (i.e., gNB), an absolute position of a UE, a TRP association, and/or combinations thereof.

In some embodiments, the BFI counter associated with each group is a physical layer (i.e., Layer-1) counter, wherein the UE is further configured with one MAC layer counter, wherein the MAC layer counter is associated with multiple physical layer BFI counters.

In certain embodiments, incrementing the BFI counter associated with a particular group by one comprises incrementing the BFI counter at the physical layer when the measured signal strength is below the threshold value. In such embodiments, no BFI indication is sent from the physical layer to the MAC layer when if the BFI counter for any one of the plurality of groups is below a maximum allowed value of beam failures for that group.

In some embodiments, the transceiver further sends a BFI indication from the physical layer to the MAC layer when the BFI counter for all of the plurality of groups meets or exceeds a maximum allowed value of beam failures for each group. In certain embodiments, the processor further declares BFD at the physical layer for a particular group when the BFI counter for the particular group is meets or exceeds the maximum allowed value of beam failures for that group.

In further embodiments, the processor may identify whether an additional group is associated with at least one valid beam and transmitting UCI to the RAN using the at least one valid beam in response to identifying that an additional group has at least one valid beam, said UCI comprising a BFD indication for the particular group.

In some embodiments, the BFD RS threshold value is a network-configured threshold value and wherein the maximum value of beam failure counter for each group is a network-configured maximum value.

In some embodiments, each of the plurality of groups corresponds to a geographical zone, the transceiver further receives a zone configuration from the RAN via system information broadcast, said zone configuration being received prior to receiving the configuration for multiple sets of BFD RS.

In some embodiments, the configuration for multiple sets of BFD RS comprises a common configuration shared by a group of UEs, where each configured BFD RS set comprises at least one shared BFD RS. In certain embodiments, the processor further shares a BFI among all UEs in the group of UEs via sidelink groupcast messaging and sending a BFI indication from the physical layer to the MAC layer in response to receiving a sidelink BFI indication.

Disclosed herein is a third method for location-based beam failure detection and recovery, according to embodiments of the disclosure. The third method may be performed by a UE device, such as the remote unit 105, the UE 205, and/or the user equipment apparatus 700, described above. The third method includes receiving a configuration from a RAN for multiple sets of BFD RS, multiple BFI counters, and an association of at least one BFD RS set and a corresponding BFI counter to one of a plurality of groups. The third method includes measuring a signal strength on the BFD RS for each group and comparing the measured signal strength with a BFD RS threshold value. The third method includes incrementing the BFI counter associated with a particular group by one if the measured signal strength is below the threshold value and initiating a random-access procedure by MAC layer in response to the BFI counter reaching a maximum value of beam failure counter for each group.

In some embodiments, initiating a random-access procedure by the MAC layer occurs only when the BFI counter for each group reaches a network-configured maximum value of beam failure counter. In some embodiments, the group is defined based on at least one attribute selected from: a UE position relative to a RAN node (i.e., gNB), an absolute position of a UE, a TRP association, and/or combinations thereof.

In some embodiments, the BFI counter associated with each group is a physical layer (i.e., Layer-1) counter, wherein the UE is further configured with one MAC layer counter, wherein the MAC layer counter is associated with multiple physical layer BFI counters.

In certain embodiments, incrementing the BFI counter associated with a particular group by one comprises incrementing the BFI counter at the physical layer when the measured signal strength is below the threshold value. In such embodiments, no BFI indication is sent from the physical layer to the MAC layer when if the BFI counter for any one of the plurality of groups is below a maximum allowed value of beam failures for that group.

In some embodiments, the third method further includes sending a BFI indication from the physical layer to the MAC layer when the BFI counter for all of the plurality of groups meets or exceeds a maximum allowed value of beam failures for each group. In certain embodiments, the third method further includes declaring BFD at the physical layer for a particular group when the BFI counter for the particular group is meets or exceeds the maximum allowed value of beam failures for that group.

In further embodiments, the third method may include identifying whether an additional group is associated with at least one valid beam and transmitting UCI to the RAN using the at least one valid beam in response to identifying that an additional group has at least one valid beam, said UCI comprising a BFD indication for the particular group.

In some embodiments, the BFD RS threshold value is a network-configured threshold value and wherein the maximum value of beam failure counter for each group is a network-configured maximum value.

In some embodiments, each of the plurality of groups corresponds to a geographical zone, the method further comprising receiving a zone configuration from the RAN via system information broadcast, said zone configuration being received prior to receiving the configuration for multiple sets of BFD RS.

In some embodiments, the configuration for multiple sets of BFD RS comprises a common configuration shared by a group of UEs, where each configured BFD RS set comprises at least one shared BFD RS. In certain embodiments, the third method further includes sharing a BFI among all UEs in the group of UEs via sidelink groupcast messaging and sending a BFI indication from the physical layer to the MAC layer in response to receiving a sidelink BFI indication.

Disclosed herein is a fourth apparatus for location-based beam failure detection and recovery, according to embodiments of the disclosure. The fourth apparatus may be implemented by a network entity, such as the base unit 121, the RAN node 207, and/or the network apparatus 800, described above. The fourth apparatus includes a processor that configures a UE for multiple sets of BFD RS, multiple BFI counters, and an association of at least one BFD RS set and a corresponding BFI counter to one of a plurality of groups. The fourth apparatus includes a transmitter that transmits one or more BFD RS for each group and a receiver that receives a BFD indication from the UE for one of a plurality of groups. The processor configures the UE with new candidate beams in response to the BFD indication.

In some embodiments, the group is defined based on at least one attribute selected from: a UE position relative to a RAN node (i.e., gNB), an absolute position of a UE, a TRP association, and/or combinations thereof. In some embodiments, the configuration for the set of shared BFD RS indicates the BFD RS threshold value and the maximum value of beam failure.

In some embodiments, the BFI counter associated with each group is a physical layer (i.e., Layer-1) counter. In such embodiments, the UE is further configured with one MAC layer counter, where the MAC layer counter is associated with multiple physical layer BFI counters.

In some embodiments, the configuration for multiple sets of BFD RS comprises a common configuration shared by a group of UEs, wherein each configured BFD RS set comprises at least one shared BFD RS. In such embodiments, the processor further includes configuring at least one UE in the group of UEs as a primary UE that performs BFD and BFR procedures using commonly configured BFD RS sets and configuring the group of UEs with new candidate shared beams based on BFD by the at least one primary UE.

In certain embodiments, the processor further configures at least one UE in the group of UEs as a secondary UE that signals a BFI indication to the group of UEs based on the commonly configured BFD RS sets. In such embodiments, the secondary UE does not declare BFD for itself or any other UE belonging to the group of UEs.

Disclosed herein is a fourth method for location-based beam failure detection and recovery, according to embodiments of the disclosure. The fourth method may be performed by a network entity, such as the base unit 121, the RAN node 207, and/or the network apparatus 800, described above. The fourth method includes transmitting a configuration to a UE for multiple sets of BFD RS, multiple BFI counters, and an association of at least one BFD RS set and a corresponding BFI counter to one of a plurality of groups. The fourth method includes transmitting one or more BFD RS for each group and receiving a BFD indication from the UE for one of a plurality of groups. The fourth method includes configuring the UE with new candidate beams in response to the BFD indication.

In some embodiments, the group is defined based on at least one attribute selected from: a UE position relative to a RAN node (i.e., gNB), an absolute position of a UE, a TRP association, and/or combinations thereof. In some embodiments, the configuration for the set of shared BFD RS indicates the BFD RS threshold value and the maximum value of beam failure.

In some embodiments, the BFI counter associated with each group is a physical layer (i.e., Layer-1) counter. In such embodiments, the UE is further configured with one MAC layer counter, where the MAC layer counter is associated with multiple physical layer BFI counters.

In some embodiments, the configuration for multiple sets of BFD RS comprises a common configuration shared by a group of UEs, wherein each configured BFD RS set comprises at least one shared BFD RS. In such embodiments, the fourth method further includes configuring at least one UE in the group of UEs as a primary UE that performs BFD and BFR procedures using commonly configured BFD RS sets and configuring the group of UEs with new candidate shared beams based on BFD by the at least one primary UE.

In certain embodiments, the fourth method further includes configuring at least one UE in the group of UEs as a secondary UE that signals a BFI indication to the group of UEs based on the commonly configured BFD RS sets. In such embodiments, the secondary UE does not declare BFD for itself or any other UE belonging to the group of UEs.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment ("UE") for wireless communication, comprising:

a memory; and a processor coupled with the memory and configured to cause the UE to:

receive a configuration from a radio access network ("RAN") for multiple sets of beam failure detection ("BFD") reference signals ("RS"), including a set of shared BFD RS, wherein the set of shared BFD RS is quasi-co-located with a set of shared UE receive ("Rx") beams applicable to a group of UEs, and wherein the configuration further comprises multiple Beam Failure Instance ("BFI") counters including a shared BFI counter, and an association of at least one BFD RS set and a corresponding BFI counter to one of a plurality of RS groups;

measure a signal strength on one or more of the multiple sets of BFD RS, including the set of shared BFD RS;

increment the shared BFI counter by one in response to the measured signal strength associated with the set of shared BFD RS satisfying a BFD RS threshold value;

increment the shared BFI counter by one in response to receiving a BFI indication from a UE in the group of UEs; and declare BFD for the group of UEs in response to the shared BFI counter reaching a maximum value of beam failure.

2. The UE of claim 1, wherein to declare BFD, wherein the processor is configured to cause the UE to initiate a random-access procedure via a medium access control ("MAC") layer in response to the shared BFI counter reaching a maximum value of beam failure.

3. The UE of claim 1, wherein the processor is configured to cause the UE to transmit a second BFI indication to all UEs in the group of UEs in response to the measured signal strength being below the BFD RS threshold value.

4. The UE of claim 3, wherein to transmit the second BFI indication to all UEs, wherein the processor is configured to cause the UE to transmit the second BFI indication via sidelink unicast messaging, sidelink groupcast messaging, or combinations thereof.

5. The UE of claim 1, wherein the configuration for the set of shared BFD RS comprises an indication that the UE is configured as a primary UE within the group of UEs, wherein the primary UE declares BFD for itself and at least one second UE belonging to the group of UEs, wherein the primary UE initiates beam failure recovery for itself and the at least one second UE.

6. The UE method of claim 5, wherein the at least one second UE is configured as secondary UE that signals the BFI indication to the group of UEs configured with the set of shared UE Rx beams, but does not declare BFD for itself or any other UE belonging to the group of UEs.

7. The UE of claim 1, wherein the configuration for the set of shared BFD RS indicates the BFD RS threshold value and the maximum value of beam failure.

8. The UE of claim 1, wherein the processor is configured to cause the UE to declare BFD for the group of UEs in response to a respective BFI counter reaching a maximum value of beam failure counter for each RS group comprising a shared BFD RS.

9. The UE of claim 8, wherein the processor is configured to cause the UE to declare a UE-specific BFD in response to the respective BFI counter reaching a maximum value of beam failure counter for each RS group comprising a non-shared BFD RS.

10. A method performed by a user equipment ("UE"), the method comprising:

a memory; and a processor coupled with the memory and configured to cause the UE to:

receiving a configuration from a radio access network ("RAN") for multiple sets of beam failure detection ("BFD") reference signals ("RS"), including a set of shared BFD RS, wherein the set of shared BFD RS is quasi-co-located with a set of shared UE receive ("Rx") beams applicable to a group of UEs, and wherein the configuration further comprises multiple Beam Failure Instance ("BFI") counters including a shared BFI counter, and an association of at least one BFD RS set and a corresponding BFI counter to one of a plurality of RS groups;

measuring a signal strength on one or more of the multiple sets of BFD RS, including the set of shared BFD RS;

incrementing the shared BFI counter by one in response to the measured signal strength associated with the set of shared BFD RS satisfying a BFD RS threshold value;

incrementing the shared BFI counter by one in response to receiving a BFI indication from a UE in the group of UEs; and declaring BFD for the group of UEs in response to the shared BFI counter reaching a maximum value of beam failure.

11. A base station for wireless communication, comprising:

a memory; and a processor coupled with the memory and configured to cause the base station to:

transmit, to a user equipment ("UE"), a first configuration for multiple sets a set of shared beam failure detection ("BFD") reference signals ("BFD-RS"), including of BFD RS, wherein the set of shared BFD RS is quasi-co-located with a set of shared UE receive ("Rx") beams applicable to a group of UEs, and wherein the first configuration further comprises multiple Beam Failure Instance ("BFI") counters including a shared BFI counter, and an association of at least one BFD RS set and a corresponding BFI counter to one of a plurality of RS groups;

transmit one or more shared BFD RS;

receive a BFD indication from the UE for group of UEs; and transmit a second configuration to the group of UEs in response to the BFD indication, wherein the second configuration comprises new candidate beams.

12. The base station of claim 11, wherein the first configuration configures the UE as a primary UE, wherein the primary UE declares BFD for itself and at least one second UE belonging to the group of UEs, wherein the primary UE initiates beam failure recovery for itself and the at least one second UE.

13. The base station of claim 11, wherein the first configuration configures the UE as a secondary UE, wherein the first configuration comprises an instruction to transmit a BFI indication to the group of UEs configured with the set of shared UE Rx beams, and an instruction to forgo declaring but does not declare BFD for the secondary UE or any other UE belonging to the group of UEs.

14. The base station of claim 11, wherein the first configuration indicates a BFD RS threshold value and a maximum value of beam failure.

15. A method performed by a base station, the method comprising:

transmitting, to a user equipment ("UE"), a first configuration for multiple sets of beam failure detection ("BFD") reference signals ("RS"), including a set of shared BFD RS, wherein the set of shared BFD RS is quasi-co-located with a set of shared UE receive ("Rx") beams applicable to a group of UEs, and wherein the first configuration further comprises multiple Beam Failure Instance ("BFI") counters including a shared BFI counter, and an association of at least one BFD RS set and a corresponding BFI counter to one of a plurality of RS groups;

transmitting one or more shared BFD RS;

receiving a BFD indication from the UE for group of UEs; and transmitting a second configuration to the group of UEs in response to the BFD indication, wherein the second configuration comprises new candidate beams.

16. The method of claim 15, wherein the first configuration configures the UE as a primary UE, wherein the primary UE declares BFD for itself and at least one second UE belonging to the group of UEs, wherein the primary UE initiates beam failure recovery for itself and the at least one second UE.

17. The method of claim 15, wherein the first configuration configures the UE as a secondary UE, wherein the first configuration comprises an instruction to transmit a BFI indication to the group of UEs configured with the set of shared UE Rx beams, and an instruction to forgo declaring but does not declare BFD for the secondary UE or any other UE belonging to the group of UEs.

18. The method of claim 15, wherein the first configuration indicates a BFD RS threshold value and a maximum value of beam failure.

19. The method of claim 10, wherein the configuration for the set of shared BFD RS comprises an indication that the UE is configured as a primary UE within the group of UEs, wherein the primary UE is configured to declare BFD for itself and at least one second UE belonging to the group of UEs, and wherein the primary UE is configured to initiate beam failure recovery for itself and the at least one second UE.

20. The method of claim 10, wherein declaring BFD for the group of UEs occurs in response to a respective BFI counter reaching a maximum value of beam failure counter for each RS group comprising a shared BFD RS, the method further comprising:

declaring a UE-specific BFD in response to the respective BFI counter reaching a maximum value of beam failure counter for each RS group comprising a non-shared BFD RS.

\* \* \* \* \*